(12) United States Patent
Moncavage et al.

(10) Patent No.: US 8,918,484 B2
(45) Date of Patent: *Dec. 23, 2014

(54) SYSTEM AND METHOD FOR RECORDING AND SHARING MUSIC

(76) Inventors: Charles Moncavage, Nazareth, PA (US); Joseph E. Maenner, Downington, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/003,079

(22) PCT Filed: Mar. 16, 2012

(86) PCT No.: PCT/IB2012/000791
§ 371 (c)(1),
(2), (4) Date: Sep. 4, 2013

(87) PCT Pub. No.: WO2012/123824
PCT Pub. Date: Sep. 20, 2012

(65) Prior Publication Data
US 2013/0346413 A1    Dec. 26, 2013

Related U.S. Application Data

(60) Provisional application No. 61/465,316, filed on Mar. 17, 2011.

(51) Int. Cl.
*G06F 15/16*    (2006.01)
*G06F 17/30*    (2006.01)
*G06Q 10/10*    (2012.01)

(52) U.S. Cl.
CPC ......... *G06F 17/30053* (2013.01); *G06Q 10/10* (2013.01)

USPC ............... 709/219; 709/217; 709/218

(58) Field of Classification Search
CPC .............. G06F 17/30053; G06Q 10/101
USPC ....................................... 709/217–219
See application file for complete search history.

(56) References Cited

U.S. PATENT DOCUMENTS 3,670,472 A    6/1972   Clifford
5,488,196 A  * 1/1996   Zimmerman et al. .......... 84/612
(Continued)

FOREIGN PATENT DOCUMENTS

EP    475 758     3/1992
EP    1 400 948   3/2004
KR    100 991 264 11/2010

OTHER PUBLICATIONS

International Preliminary Report on Patentability, PCT/IB/2012/000791, mailed Sep. 17, 2013.

(Continued)

*Primary Examiner* — Mohamed Wasel
(74) *Attorney, Agent, or Firm* — Joseph E. Maenner; Maenner & Associates, LLC

(57) ABSTRACT

A method includes the steps of electronically storing a plurality of songs on a server; allowing a first user to select one of the plurality of songs; allowing the first user to play the one of the plurality of songs and record a user-generated track while the one of the plurality of songs is playing; and saving the user-generated track on the server separate from the one of the plurality of songs. An electronic system that allows the first user to perform the method is also disclosed.

19 Claims, 40 Drawing Sheets

(56) References Cited

U.S. PATENT DOCUMENTS

| | | |
|---|---|---|
| 5,990,405 A | 11/1999 | Auten et al. |
| 6,288,319 B1 | 9/2001 | Catona |
| 6,740,802 B1 | 5/2004 | Browne, Jr. |
| 7,069,310 B1 | 6/2006 | Bartholomew |
| 7,191,023 B2 | 3/2007 | Williams |
| 7,714,222 B2 | 5/2010 | Taub et al. |
| 7,792,850 B1 | 9/2010 | Raffill et al. |
| 7,863,513 B2 | 1/2011 | Ishii et al. |
| 2003/0078973 A1 | 4/2003 | Przekop et al. |
| 2004/0093236 A1 | 5/2004 | Chacker |
| 2004/0093249 A1 | 5/2004 | Chacker |
| 2006/0180007 A1 | 8/2006 | McClinsey |
| 2007/0028750 A1 | 2/2007 | Darcie et al. |
| 2007/0140510 A1 | 6/2007 | Redmann |
| 2008/0072156 A1 | 3/2008 | Strick |
| 2008/0172137 A1 | 7/2008 | Safina |
| 2008/0212442 A1 | 9/2008 | Adam et al. |
| 2008/0225651 A1 | 9/2008 | Waites |
| 2008/0260184 A1 | 10/2008 | Bailey et al. |
| 2009/0083435 A1 | 3/2009 | Boulter et al. |
| 2009/0106429 A1 | 4/2009 | Siegal et al. |
| 2009/0164902 A1* | 6/2009 | Cohen et al. ............... 715/716 |
| 2009/0318225 A1 | 12/2009 | Yamaguchi et al. |
| 2010/0083303 A1 | 4/2010 | Redei et al. |
| 2010/0132536 A1 | 6/2010 | O'Dwyer |
| 2010/0212478 A1 | 8/2010 | Taub et al. |
| 2010/0318907 A1* | 12/2010 | Kaufman et al. ............. 715/706 |
| 2010/0326256 A1 | 12/2010 | Emerson |
| 2011/0209597 A1 | 9/2011 | Usui et al. |
| 2012/0096371 A1 | 4/2012 | D'Anna |
| 2013/0054693 A1 | 2/2013 | Chennamadhavuni |
| 2013/0132074 A1 | 5/2013 | Kim |
| 2013/0163963 A1* | 6/2013 | Crosland et al. ............. 386/285 |
| 2014/0121797 A1* | 5/2014 | Ales ............................... 700/94 |

OTHER PUBLICATIONS

Indaba Music website, www.indabamusic.com. Date unknown. 26 pages.

Alvares, Miland, "radio head offers stem stracks of 'Reckoner' on the iTunes Store", http://smokingapples.com/music/radiohead-stemtracks-reckoner-itunes-store/, Sep. 28, 2008. 4 pages.

Jorda, Sergi, "A System for Collaborative Music Composition over the Web", circa. 2001, 6 pages.

Jammit website, www.jammit.com. Date unknown. 2 pages.

Garageband website. http://www.apple.com/ipad/from-the-app-store/apps-by-apple/garageband.html. Copyright 2012. 5 pages.

PCT International Search Report and Written Opinion for PCT/IB2012/000791, mailed Nov. 5, 2012.

Office Action for U.S. Appl. No. 13/621,521, mailed Jun. 6, 2014.

www.kompoz.com website printed from www.wayback.com dated Mar. 16, 2011 (filed as three separate files due to size).

Extended European Search Report for EP 12757188.3 mailed Oct. 14, 2014.

* cited by examiner

SYSTEM AND METHOD FOR RECORDING AND SHARING MUSIC

CROSS-REFERENCE TO RELATED APPLICATION

The present application is a U.S. national stage application of PCT application Serial No. PCT/US2012/029321, filed on Mar. 16, 2012, which claims priority from U.S. Provisional Patent Application Ser. No. 61/465,316, filed on Mar. 17, 2011, the disclosure of which is incorporated herein by reference in its entirety.

FIELD OF THE INVENTION

The present invention relates to a system and method for a third party to record a musical track of a pre-recorded song and to mix other third party tracks similarly recorded to form of cover version of the pre-recorded song.

BACKGROUND OF THE INVENTION

Generating and recording music with others is a popular pastime. Typically, however, in order for people to play or record a song, all of the people have to be in the same room at the same time. Even if one or more of the musicians are unavailable while a song is being recorded, and those musicians can record their tracks later, musicians must still come to the same recording studio in order to record their tracks.

It would be beneficial to provide a system in which musicians are able to record musical tracks on their own and combine them with other tracks to form a song.

BRIEF SUMMARY OF THE INVENTION

Briefly, the present invention provides a method of recording music. The method comprises the steps of electronically storing a plurality of original songs on a server at a first location; allowing a first user to select one of the plurality of original songs from a second location across an electronic network; allowing the first user to play the one of the plurality of original songs at the second location and to record a user-generated track at the first location while the one of the plurality of original songs is playing; and saving the user-generated track on the server at the first location separate from the one of the plurality of original songs.

Further, the present invention also provides a recording system comprising a server located at a first location. The server contains a plurality of original songs in a first database. The server is electronically connected across an electronic network to a recording site. The server is adapted to simultaneously transmit one of the plurality of original songs across the network to the recording site and to record a track being played at the recording site to a second database in the server.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain features of the invention. In the drawings.

DETAILED DESCRIPTION OF THE INVENTION

Certain terminology is used in the following description for convenience only and is not limiting. The terminology includes the words above specifically mentioned, derivatives thereof and words of similar import. The embodiments described and illustrated below are not intended to be exhaustive or to limit the invention to the precise form disclosed. These embodiments are chosen and described to best explain the principle of the invention and its application and practical use and to enable others skilled in the art to best utilize the invention.

As used herein, an "original song" or a "master song" is a commercially available song that can be purchased from a mass media distributer, such as, for example, iTunes, Amazon.com, or the like. An original song need not necessarily be the first version of the song. For example, both the Beatles' version and Elton John's version of "Lucy in the Sky with Diamonds" both fall into the category of "original song," even though the Beatles originally wrote and recorded the song, and Elton John performed and recorded his own version of the song. The original song, however, is the complete song and not a plurality of separate stem tracks that can be played simultaneously. A "cover song" is a song that is compiled by a user of the inventive system by compiling tracks that are recorded by himself/herself and/or other users of the inventive system. As used herein, a "track" is a recording of an instrument or a voice that can be combined with other tracks to form a song. In the music recording industry, such a track may also be known as a "stem track."

Referring in general to the Figures, a system 100 according to an aspect of the present invention includes a system and a method for allowing musicians to play along with pre-recorded songs downloaded from a server and to save their newly generated track for others to hear and/or download.

Figure 1:
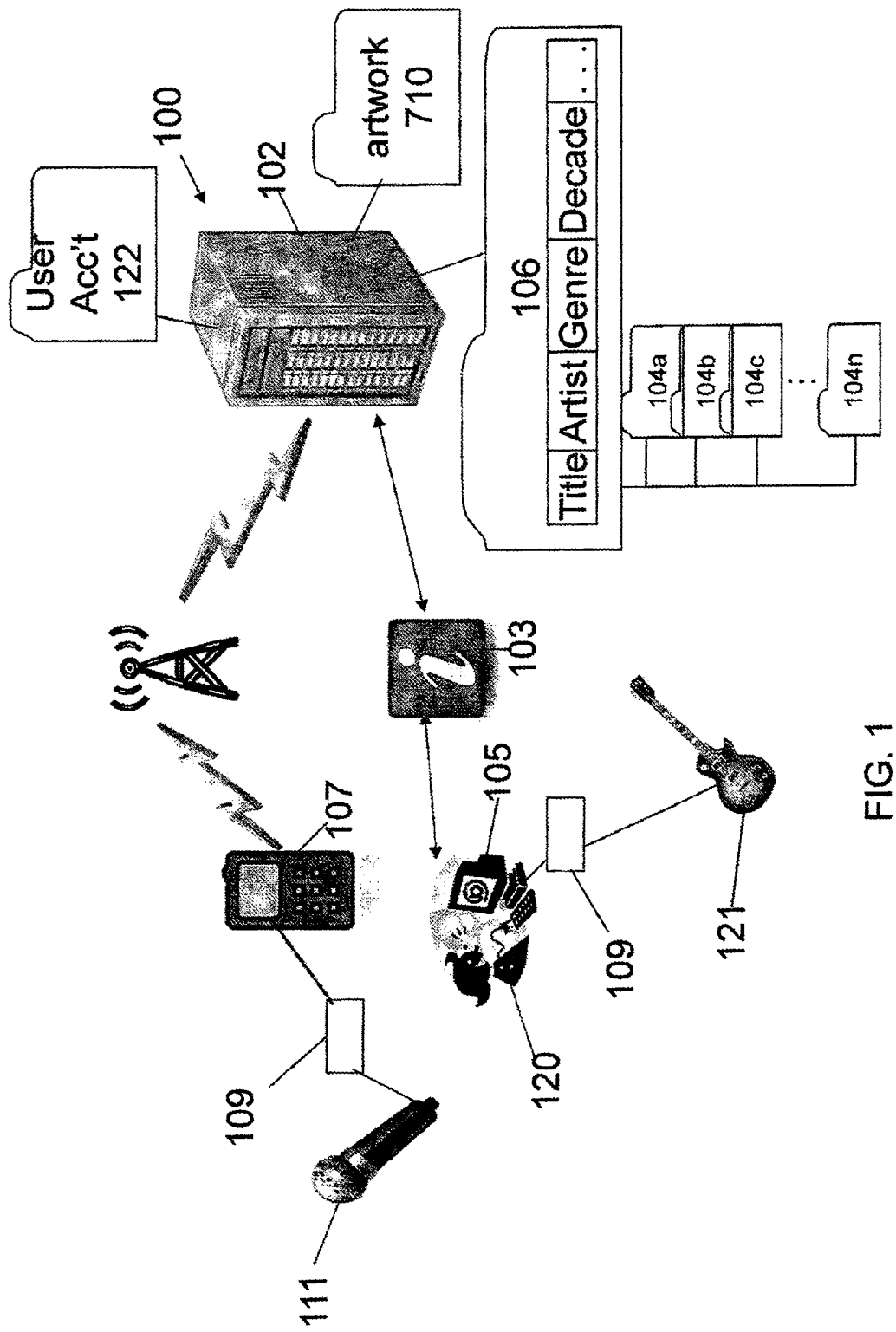
FIG. 1 is a schematic representation of an exemplary configuration of a system for recording and sharing music according to a first exemplary embodiment of the present invention.

Referring to FIG. 1, system 100 includes a server 102 that hosts electronic versions of a plurality of pre-recorded songs 104a-n by popular artists in a database 106, where "n" equals the number of recorded songs 104 stored in database 106. Songs 104a-n may be stored in MP3, iTunes, or other suitable format. Songs 104a-n can be categorized according to title, recording artist, genre, decade in which it was recorded (i.e., '60's, '70's, '80's, etc.), and other suitable categories that enable songs 104a-n to be cross-referenced and accessed. Server 102 is accessible to third parties via electronic communication such as a website 103 on the Internet.

Figure 2:
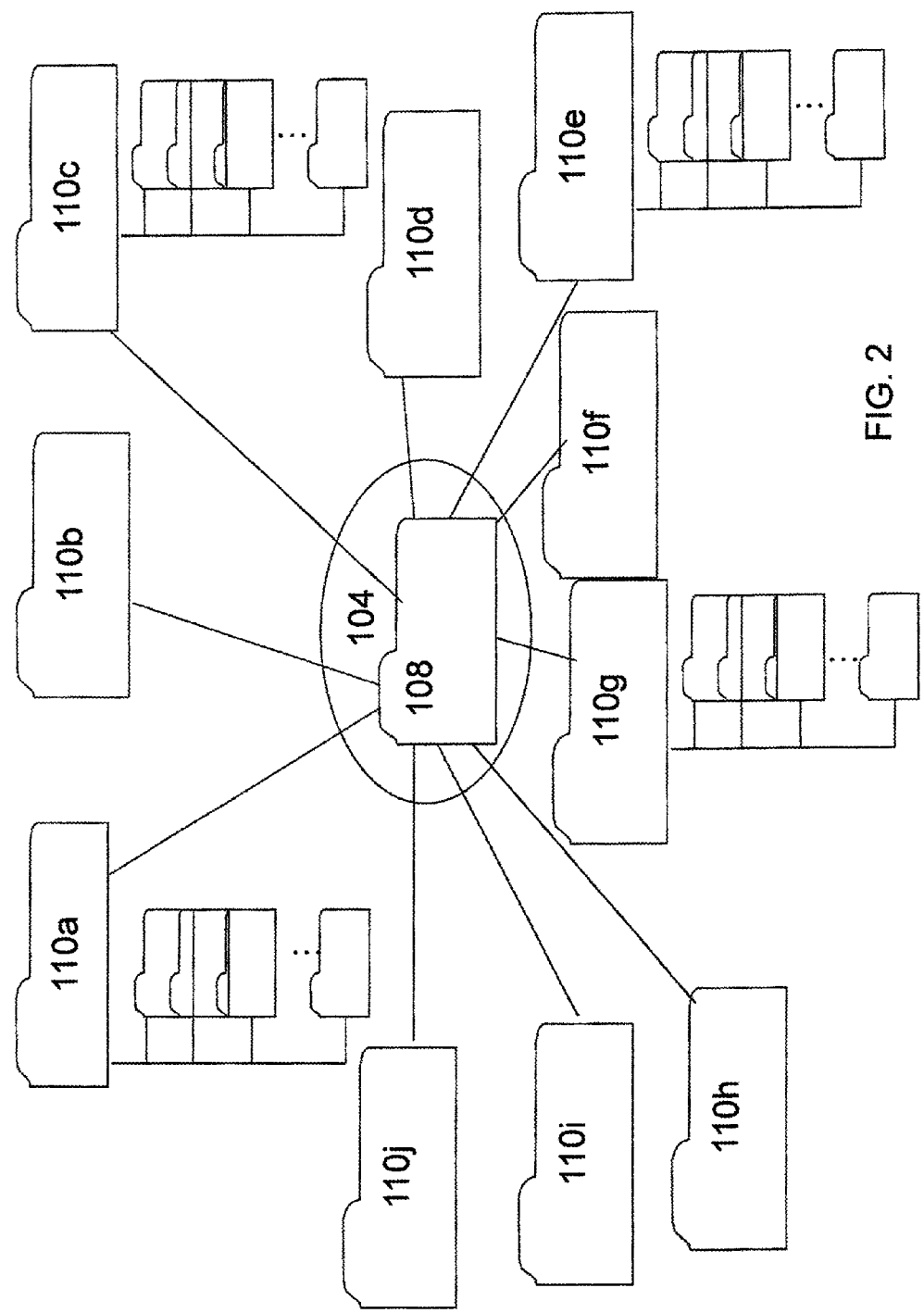
FIG. 2 is a schematic representation of file storage for the system of FIG. 1.

Referring to FIG. 2, each song 104 has a dedicated file 108 to which song 104 is assigned. Each file 108 includes a plurality of track categories 110a-n, where "n" equals the number of categories. In FIG. 2, "n"=10, although those skilled in the art will recognize that "n" can equal some other whole number. Each track category 110 represents a type of track that is played on a specific one of songs 104. For example, track categories 110 can include a lead vocal track category 110a, a background vocal track category 110b, a lead guitar track category 110c, a rhythm guitar track category 110d, a bass track category 110e, a keyboard track category 110f, a drum track category 110g, a horn track category 110h, a woodwind track category 110i, and a miscellaneous track category 110j, into which all tracks not fitting into any of the other track categories will be placed.

Referring back to FIG. 1, a user 120 accesses system 100 by going to website 103 and logging in to their account 122, which is stored on server 102. User 120 can access website 103 via a computer 105, a cell phone 107, or other suitable means for accessing a website.

Figure 3:
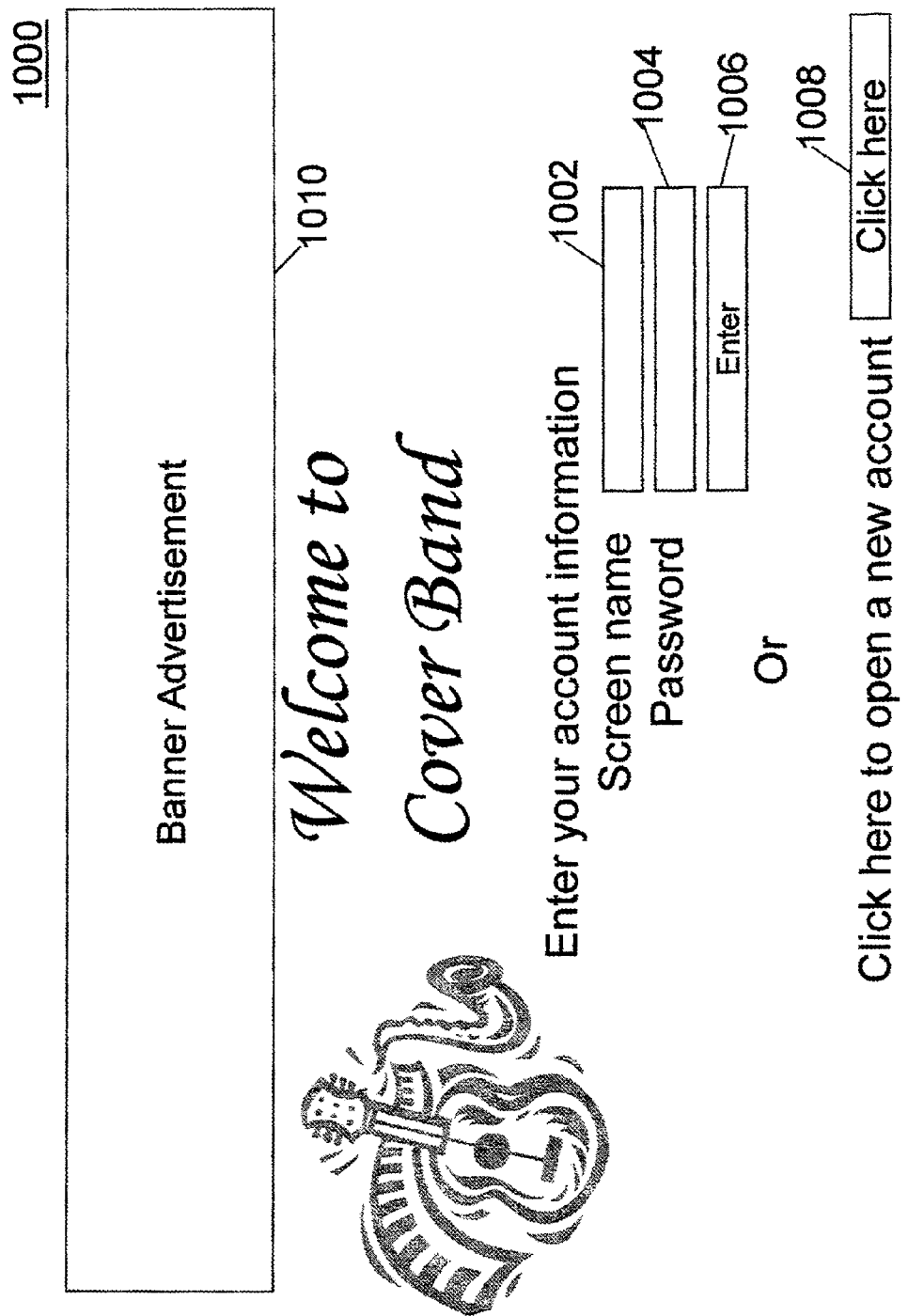
FIG. 3 is an exemplary graphical user interface (GUI) for a cover page and login screen to access the system of FIG. 1.

When user 120 accesses website 103, an exemplary GUI 1000, shown in FIG. 3, appears, which includes a screen name block 1002 and a password block 1004 that allow a user 120 to enter his/her screen name and password to enter the system 100. After user 120 has entered his/her screen name and password, user 120 can click on block 1006 to go to their homepage, which is shown in an exemplary GUI 1200 shown in FIG. 6.

Alternatively, if user 120 is a new user to system 100, user 120 can click on block 1008 to open a new account. By opening an account of system 100, user 120 becomes a "member" of system 100. The GUI 1000 can also include a banner advertisement 1010 to advertise goods or services from a paid advertiser.

Figure 4:
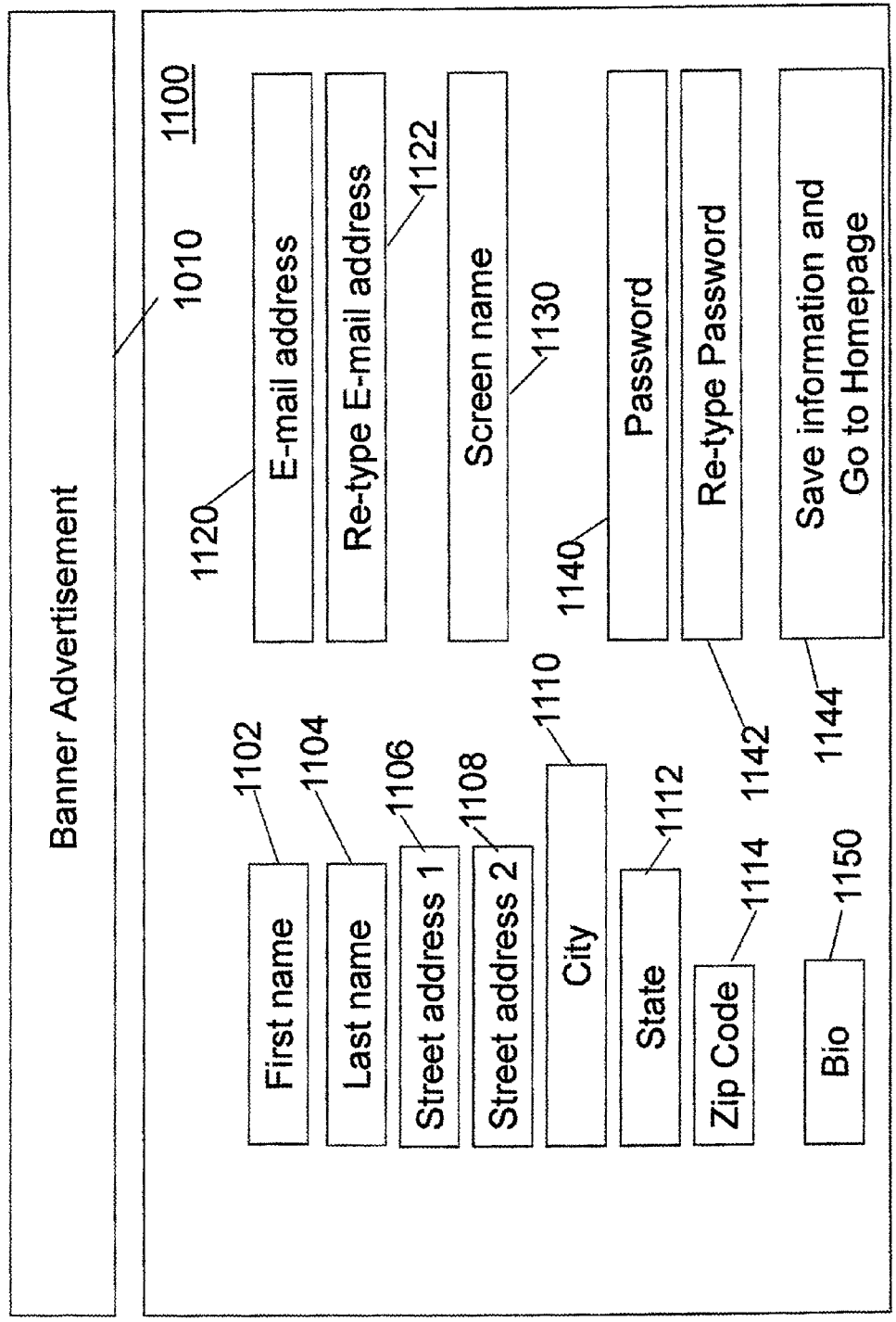
FIG. 4 is an exemplary GUI for a user information page for the system of FIG. 1.

If user 120 is a new user with system 100, and clicks on block 1008, an exemplary GUI 1100, shown in FIG. 4, appears. GUI 1100 includes blocks for user 120 to register with system 100, including blocks 1102-1114, which require identity and contact information for user 120. Block 1120 requires user 120 to enter his/her e-mail address and block 1122 requires user 120 to reenter his/her e-mail address to ensure its accuracy. Block 1130 requires user 120 to enter a screen name. In an exemplary embodiment, only one screen name can be registered per e-mail address. System 100 may include a filter that prevents vulgar language from being used as a screen name. If the selected screen name is considered to be vulgar, or is already used, a notice (not shown) will be provided to user 120 requesting that user 120 pick a new screen name. User 120 is prompted to create a screen name so that user 120 can remain anonymous to the remainder of system users if user 120 desires to do so.

After user 120 has selected an acceptable screen name, user 120 enters a password into block 1140 and reenters the password into block 1142 to ensure its accuracy. Additionally, block 1150 allows user 120 to upload his/her biographical information, along with photos and other personal information about user 120. Clicking on block 1150 generates an exemplary GUI 1160 shown in FIG. 5. Block 1152 allows user 120 to freehand enter any information about himself/herself that he/she wishes other members of system 100 to see. Block 1154 allows user 120 to download photos, and block 1154 lists all of the songs that user 120 has contributed to through system 100.

Optionally, user 120 can link to his/her social networking page, such as for example, Facebook, through block 1158. After user 120 has input desired information into blocks 1152 and 1154, user 120 can click on block 1162 to return to GUI 1100. After user 120 has entered all of his/her information in GUI 1100, user 120 clicks on block 1144 to save the information and to go to his/her homepage, which is shown in an exemplary GUI 1200, shown in FIG. 6.

GUI 1200 includes a label 1202 at the top of the page that lists the username with the word "homepage." GUI 1200 includes several blocks 1204-1220 that allow user 120 to interface with system 100. Additionally, GUI 1200 includes a block 1222 that provides a spreadsheet listing all of the tracks 122 that user 120 has recorded through system 100. GUI 1200 also includes an instant messaging block 1230 that allows user 120 to instant message other users of the system 100. Additionally, GUI 1200 includes a mailbox 1240 that allows user 120 to send and receive e-mails from other users of system 100 as well as the administrator of system 100. GUI 1200 may further include banner advertising 1250 at the top of GUI 1200.

Referring back to FIG. 6, in block 1206, user 120 can "go to studio" to record a track 122 or to mix previously recorded tracks 122*a-n* (where "n" is a number of tracks 122 that user 120 desires to mix to form a cover song). Clicking on block 1206 generates an exemplary GUI 1700 shown in FIG. 7, with drop-down boxes 1206*a* for recording a track and drop-down box 1206*b* for mixing a track.

In an exemplary embodiment, user 120 can provide his/her own version of an original song if the original song is not in database 106. User 120, however, must provide sufficient information about the original song so that a different user can readily determine the original song and use the original song in order to record his/her own track. Once user 120 provides this information, system 100 is able to set up a dedicated file 108 in database 106 for that original song. If, after user 120 records his/her track, and another user would like to record a track based on the same original song, system 100 provides an indication to the other user at the original song is not in database 106, and the other user must provide his/her own version of the original song.

Figure 8:
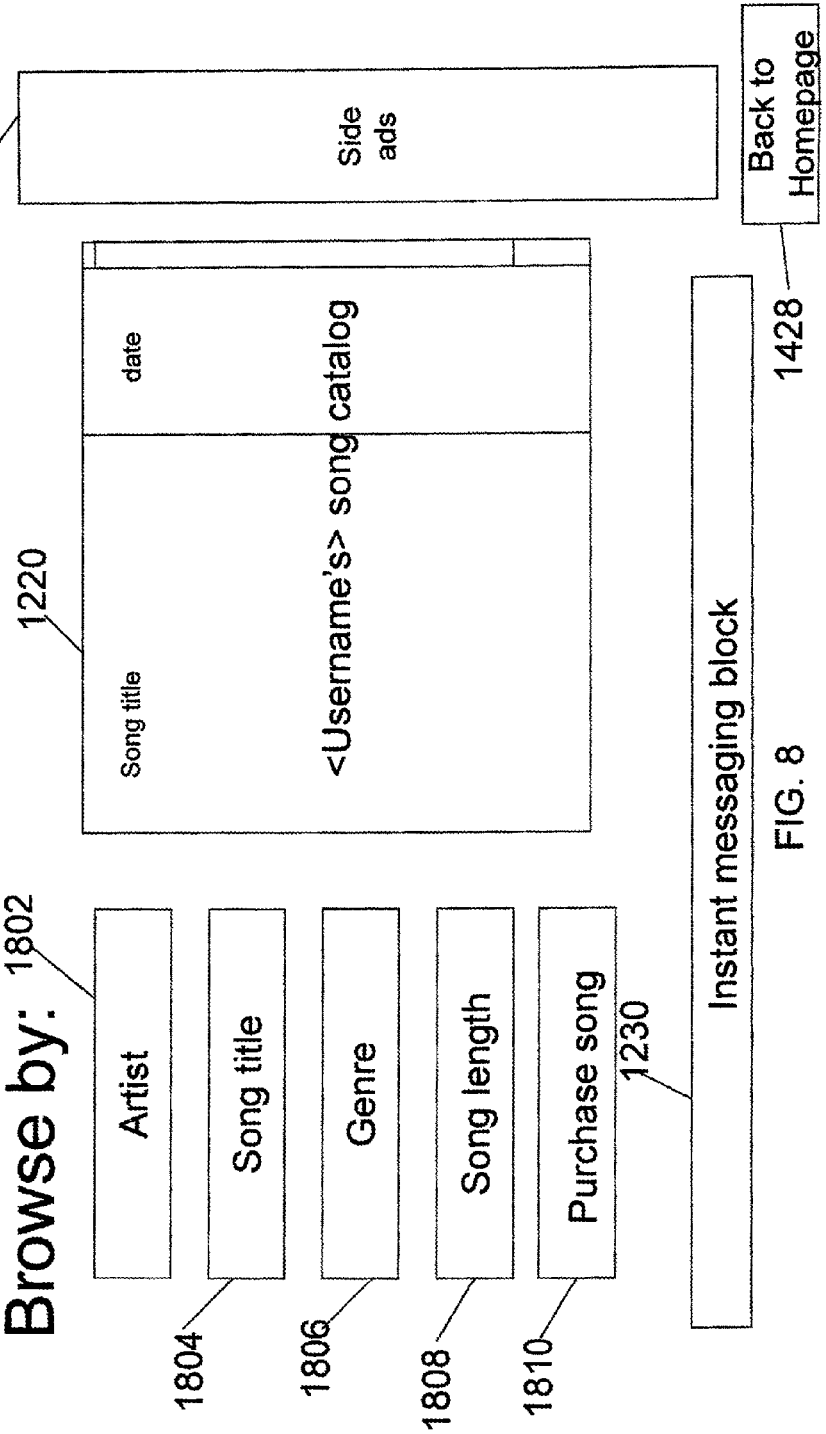
FIG. 8 is an exemplary GUI illustrating an exemplary method for selecting a song for a user to listen and record to according to the system of FIG. 1.

If user 120 uses an original song from database 106, user 120 clicks on block 1206*a*, which generates an exemplary GUI 1800 shown in FIG. 8. Side bar advertisements 1450 can be displayed in GUI 1800 and can be selected to represent the type of goods or service that user 120 may be more inclined to purchase based on the qualities of the avatar 1430. For example, if user 120 is a guitar player, top banner advertisements 1010 and side bar advertisements 1450 may reflect guitar equipment or services for sale. While top banner advertisement 1010 is illustrated in GUI 1000 in FIG. 3 and side bar advertisement 1450 is illustrated in GUI 1800, those skilled in the art will recognize that 1010 and side bar advertisement 1450 can be shown in other GUI's displayed by system 100.

Figure 8A:
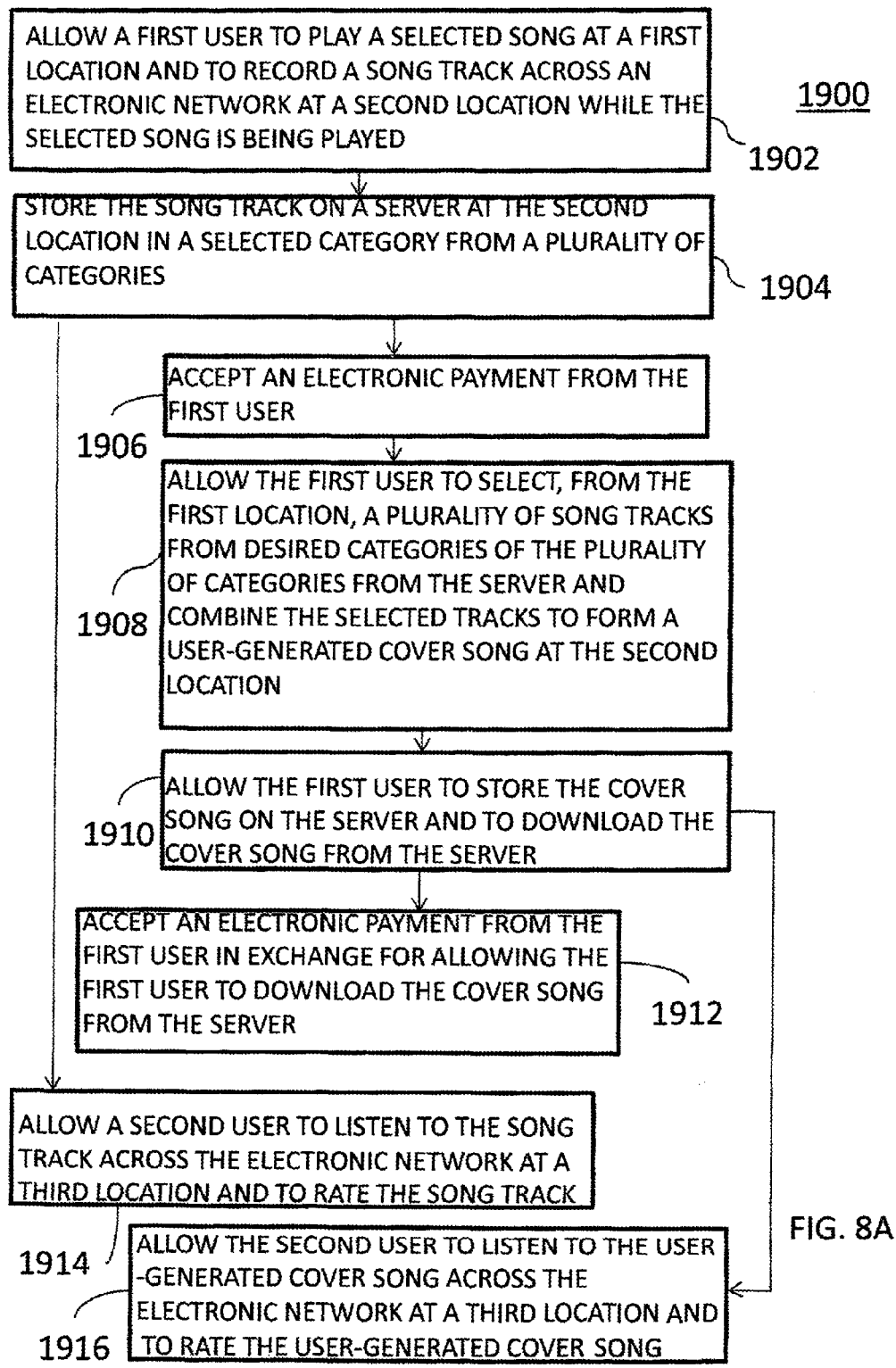
FIG. 8A is a flowchart illustrating an exemplary operation of the system of the present invention.

Referring to flowchart 1900 shown FIG. 8A, a brief overview of the operation of one exemplary aspect of the present invention is provided. Step 1902 allows a user 120 to play a selected song from server 102 and to record a song track 122 across electronic network 103 at a second location, such as, for example his/her home computer 105 while the selected song is being played. In step 1904, system 100 stores the song track on server 102 in a selected category 110*a* from a plurality of categories 110*a*-110*j*. In step 1906, system 100 accepts an electronic payment from user 120 prior to user 120 to select a plurality of song tracks 122. In step 1908, system 100 allows users 120 to select, from his/her home computer 105, a plurality of song tracks 1 to 2 from desired categories of the plurality of categories 110*a*-110*n* from server 102 and combine the selected tracks to form a user-generated cover song at his/her computer 105. In step 1910, system 100 allows user 120 to store the cover song on server 102 and to download the cover song from server 102. In step 1912, system 100 accepts a payment from user 120 in exchange for allowing user 122 download the cover song from server 102.

Figure 6:
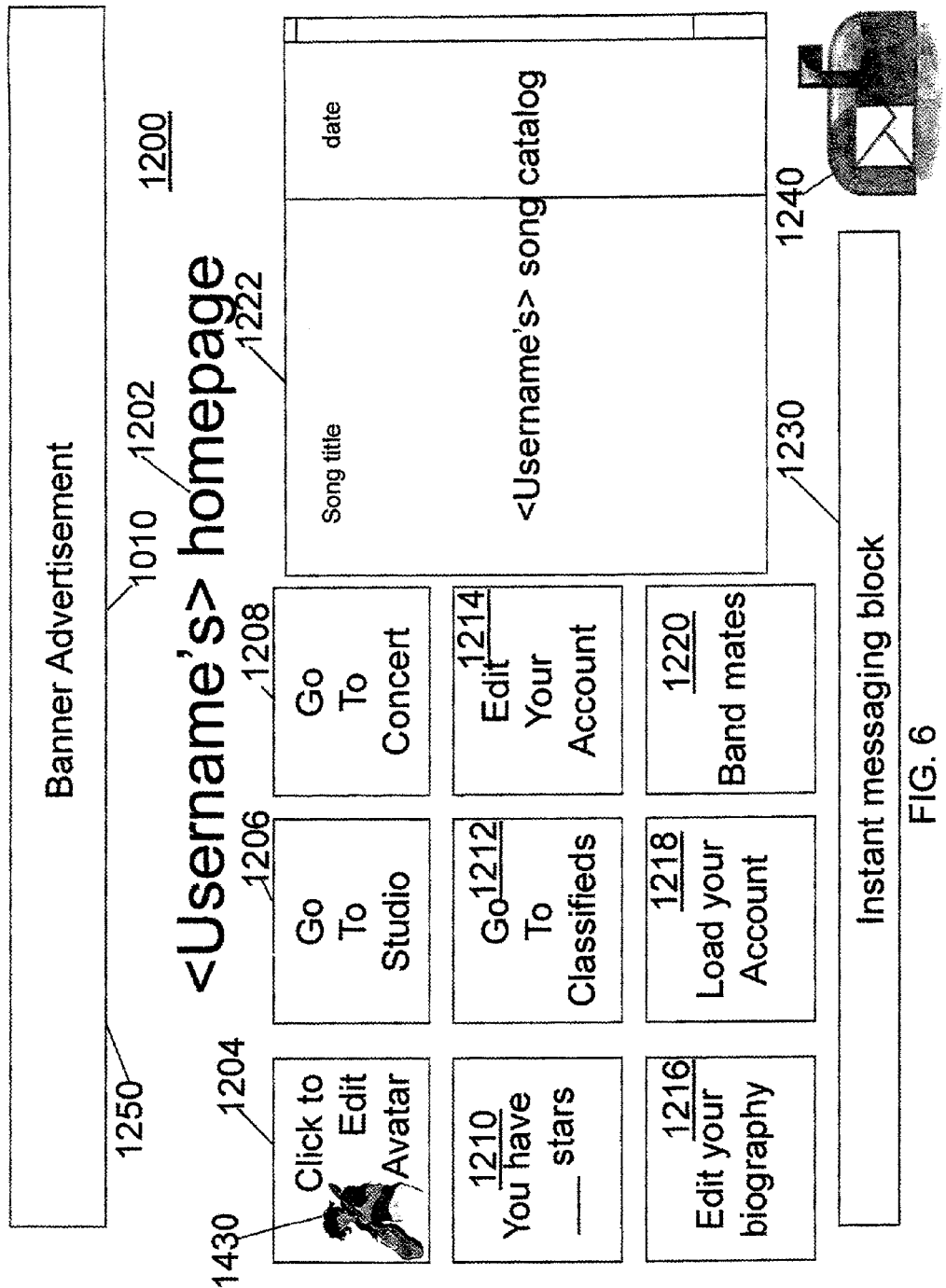
FIG. 6 is an exemplary GUI for a user's homepage for the system of FIG. 1.
Figure 7:
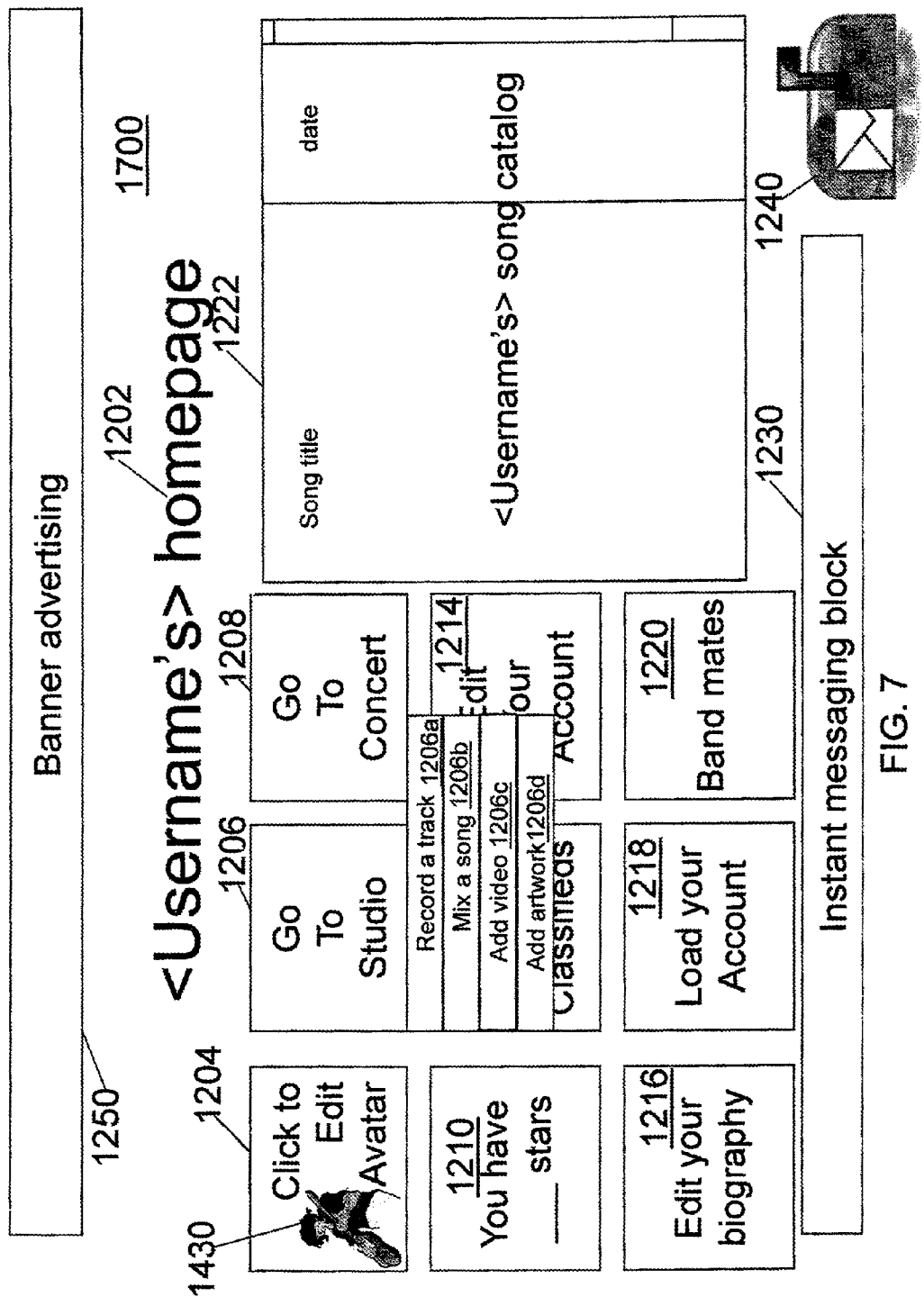
FIG. 7 is an exemplary GUI illustrating options for a user to record or mix a song using the system of FIG. 1.
Figure 9:
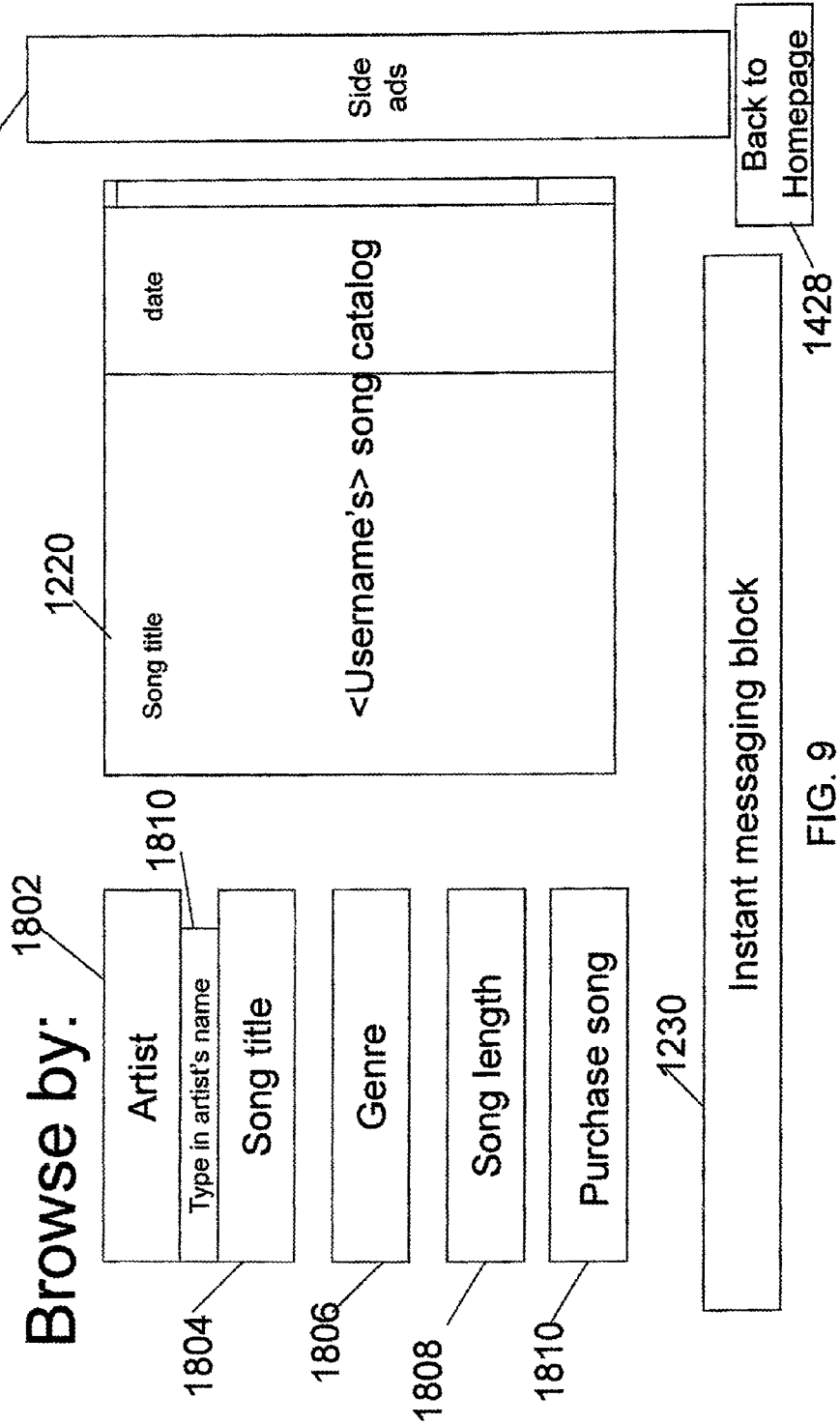
FIG. 9 is an exemplary GUI illustrating an exemplary method for selecting a song based on the name of the artist according to the system of FIG. 1.
Figure 10:
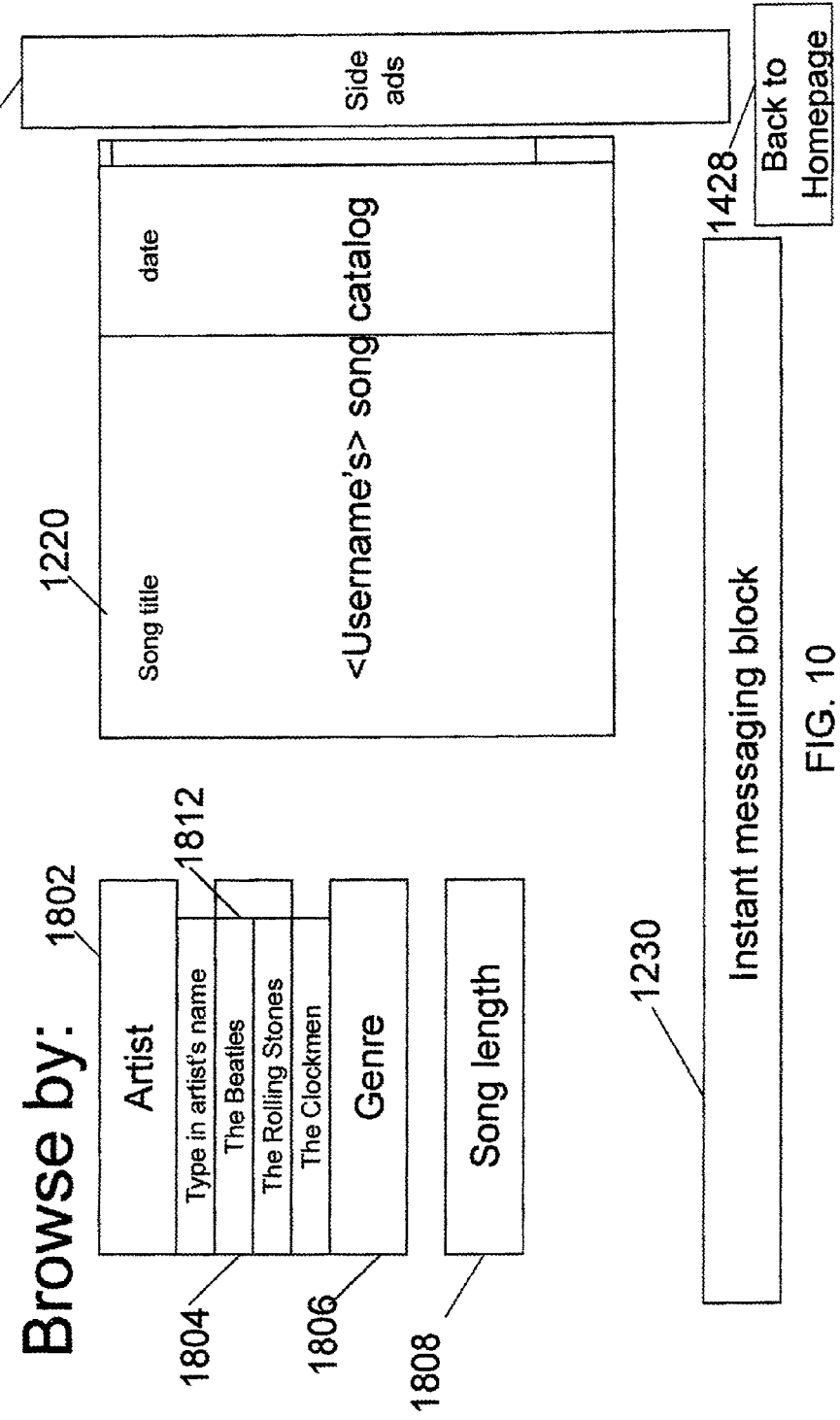
FIG. 10 is an exemplary GUI illustrating a drop-down menu for selecting an artist according to the system of FIG. 1.

GUI 1800 allows user 120 to select a song for recording based on categories such as artist (by clicking block 1802), song title (by clicking block 1804), genre (by clicking block 1806), or song length (by clicking block 1808). Spreadsheet 1220 from GUI 1200 in FIG. 6 is also displayed in GUI 1800. To select an original song for which to record a cover track 122, user 120 can select one of blocks 1802-1808, which generates a drop-down box, such as 1810 shown in an exemplary GUI 2000 in FIG. 9. Drop-down box 1810 allows user 120 to type in information about the song, such as, for example, the name of an artist whose original song for which user 120 would like to record a track 122. If user 120 has already recorded a track 122 based on an artist's original song, the name of the artist will also appear in drop-down box 1812 as shown in an exemplary GUI 2200 in FIG. 10.

Figure 11:
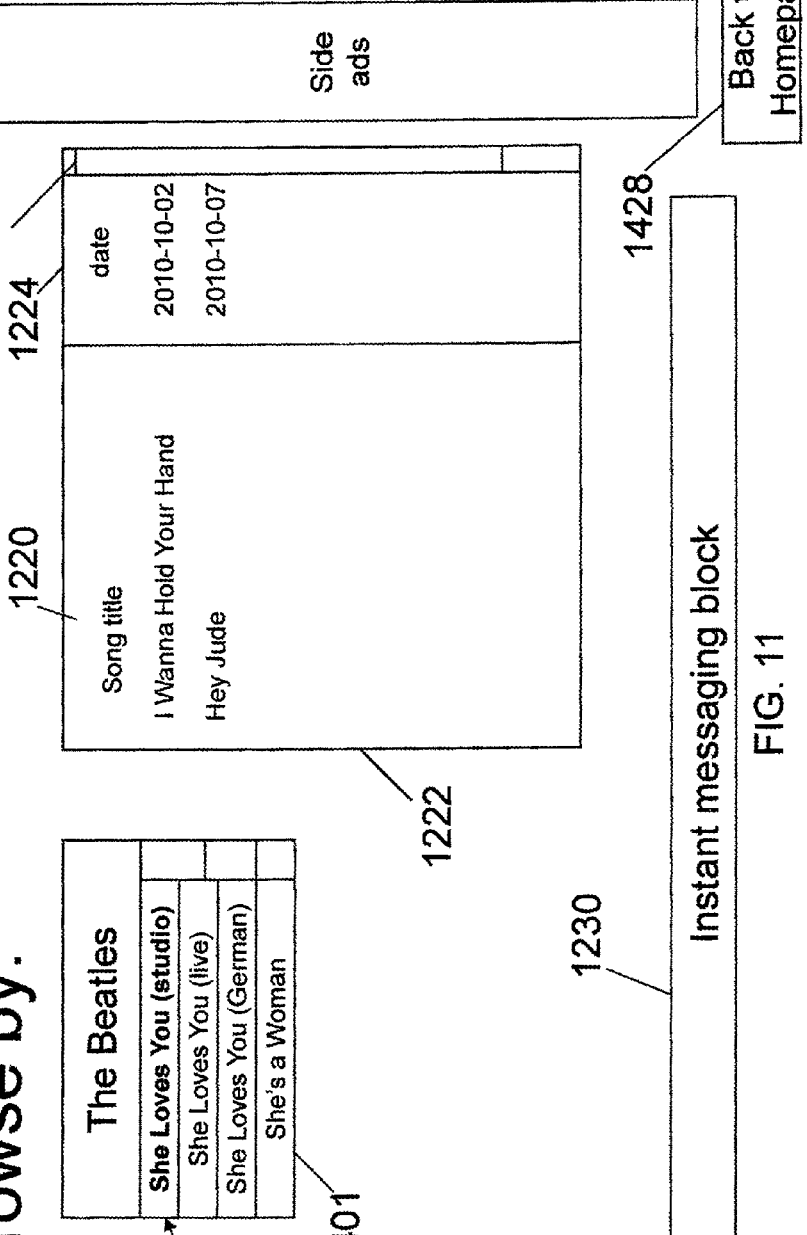
FIG. 11 is an exemplary GUI illustrating a drop-down menu of songs by the artist selected in FIG. 10.

User 120 can either type in the name of the artist or click on the artist's name. User 120 can select the artist by hitting "enter" after the artist's name or clicking on the artist's name, which will generate an exemplary GUI 2400 in FIG. 11, which provides a drop-down box 2401 of songs available by that artist on server 102. User 120 can scroll down the list of songs and select a song by hitting "enter" when arrow 2402 is over the box representing the desired song. The artist's songs can be listed alphabetically or, alternatively the songs can be listed by specific album, with the artist albums listed in chronological order of their release date.

Other songs that user 120 has recorded from the selected artist appear in spreadsheet 1220. In an exemplary embodiment, spreadsheet 1220 includes a first column 1222 entitled "song title", which lists the titles of the songs that user 120 has recorded from the selected artist. A second column 1224 entitled "date", lists the date on which user 120 last recorded a track for that song. If the number of songs in spreadsheet 1220 is larger than the size of the spreadsheet, a scrollbar 1226 can appear on the right-hand side of spreadsheet 1220 to allow user 120 the ability to scroll down the list of songs 122.

Similarly, user 120 can select block 1806, which will generate a drop-down box (not shown) illustrating a list of genres from which user 120 can select. User 120 can alternately select block 1808, which will generate a drop-down box (not shown) providing ranges of song lengths such as, for example less than 2:00, 2:00-2:59, 3:00-3:59, 4:00 and longer, etc. User 120 can select a desired range. Songs 104 in database 102 that match the selected criteria appear in spread sheet 1220 and allow user 120 to select a desired song 104 from the list.

If, however, user 120 does not know the name of the artist or does not desire to search by artist, genre, or song length, in GUI 1800 in FIG. 8, user 120 can click on block 1804 for "song title", which will generate a drop-down box (not shown) to allow user 120 to type in the title of the desired song. If the song is in the database 102, all variations of the song that are in database 102 will be shown in spreadsheet 1220, along with songs having similar titles, in the event that user 120 misspelled the title or omitted a word in the title.

After user 120 has selected a desired song, user 120 can click on block 1810 to purchase the song through the user's previously loaded account. Optionally, instead of having to pay for a particular song that user 120 has already purchased, such as for example, through iTunes, user 120 can port the song from iTunes into system 100. This prevents user 120 from having to pay for the same song more than once.

After user 120 has selected the song, system 100 can search the device through which user 120 has selected the song (computer 105, cell phone 107, etc.) and look for the song on that device. If the song is already on the device and is in a format that indicates to system 100 that the song was previously purchased (such as an iTunes suffix, etc.), system 100 copies the song to the user's songlist without charging the user 120 an extra fee.

Figure 12:
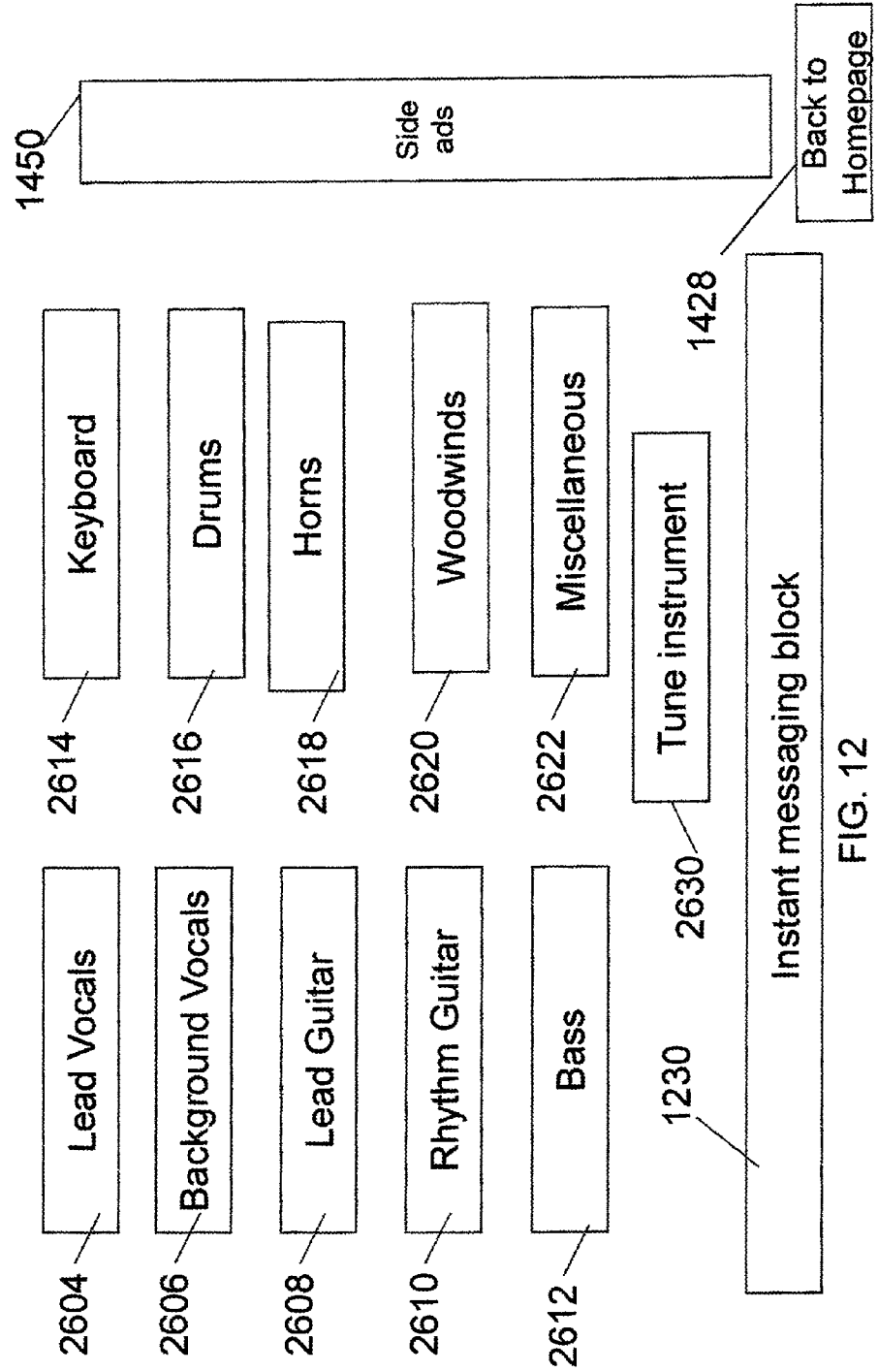
FIG. 12 is an exemplary GUI illustrating instrument options available for the song selected in FIG. 11.

After user 120 has purchased the desired song from drop down box 2401, an exemplary GUI 2600, shown in FIG. 12, appears. GUI 2600 lists the title 2602 of the selected song along with a plurality of buttons 2604-2622 that correspond with tracks 110a-110j from FIG. 2. User 120 selects the desired category from buttons 2604-2622 to which user 120 desires to record.

Referring back to FIG. 1, in order to user 120 to record his/her track 122, user 120 sets up his/her computer to record track 122. If user 120 is using an electronic instrument, such as, for example, an electric guitar/bass 121 or keyboard (not shown), user 120 can plug the output of the instrument into an adapter 109 that in turn can be plugged into a recording device, such as, for example, a computer 105 or a cell phone 107. For example, adapter 109 can include a Universal Serial Bus (USB) outlet that plus into a USB port on computer 105. Adapter 109 transmits output from the instrument directly into system 100.

Alternatively, if user 120 is using an acoustic instrument (not shown), such as, for example, an acoustic guitar, a piano, or drums, or is singing, a microphone 111 can be connected to adapter 109 and used to record the acoustic instrument. Optionally, a plurality of microphones can be connected to adapter 109 so that several instruments can be recorded simultaneously. For example, if user 120 desires to play an acoustic guitar and sing, two microphones 111 can be connected to adapter 109 to record both a guitar track and a vocal track.

In order to prevent the original song from "bleeding" into the recorded track 122 as user 120 records the track 122, it is desired that user 120 wears headphones (not shown) so that the original song is played through the headphones and is not picked up by microphone 111.

As a part of system 100, adapter 109 can be sold separately to user 120. Adapter 109 can be a part of a kit to encourage membership to system 100. For example, the kit can include adapter 109, one or more microphones 111, blank CDs and labels (not shown) to allow user 120 to burn his/her own cover songs, and a monetary credit for use with system 100. Different kits can be packaged for different types of instrument used. For example, a drum kit (not shown) may include microphones adapted specifically for drums and for cymbals; a guitar kit (not shown) may include an effects pedal or box; and a vocal kit may include a vocal microphone.

It may be desirable, prior to recording a track 122, for system 100 to obtain a sample of the sound produced by user's instrument prior to recording. For example, system 100 may determine that the user's instrument may need to be tuned so that it is in tune with other recordings. System 100 may prompt user 120 to provide a particular note or several notes to determine whether the user's instruments is in tune. If the instrument is not in tune, system 100 can prompt the user to tune the instrument, or a particular part of the instrument, such as a particular guitar string, up or down in order to gain proper tuning. Optionally, user 120 can initiate a tuning by clicking button 2630 on GUI 2600 in FIG. 12, which prompts system 100 to ask user 120 to play a particular note and then instruct user 120 to tune the instrument up or down depending on the quality of the mote played by user 120.

For an instrument that may be more difficult to tune, such as for example, an electric keyboard, system 100 may automatically adjust the tuning of the instrument as the instrument is being recorded. For example, system 100 may prompt user 120 to strike an "A" note. Regardless of the actual note that is played, system 100 interprets any note being played at that particular frequency as an "A" note. Further, user 120 can be prompted to play a chord, which can be saved by system 100 as the particular chord that was prompted.

This way, all tracks recorded by users will be in tune with the original song so that tracks can be combined and will all be played back in the same tune regardless of the tuning of each individual instrument which track is recorded.

Prior to recording, system 100 queries the device (laptop, cell phone, etc.) on which user 120 plans to record and searches all input devices for the presence of a recording device.

For example, if user 120 is planning to record a rhythm guitar track, user 120 may electronically couple the output of the guitar directly into the device on which user 120 plans to record. User 120 may connect any electronic cord from the output of his/her guitar or guitar amplifier into a USB port on the recording device. Alternatively, user 120 may plug a microphone into the microphone jack on the recording device and play his guitar into the microphone. If system 100 can not detect an external recording device, system 100 may default to an internal microphone. If the recording device does not have an internal microphone, system 100 can display a message to user 120 that alerts user 120 to plug-in a recording medium, such as a guitar cord or a microphone, into the recording device. If system 100 detects a recording device, system 100 displays GUI 2600 in FIG. 12.

When user 120 is ready to record, user 120 clicks on the appropriate button 2604-2622. For example, if user 120 desires to play rhythm guitar, user 120 selects "Rhythm Guitar" button 2608.

Figure 13:
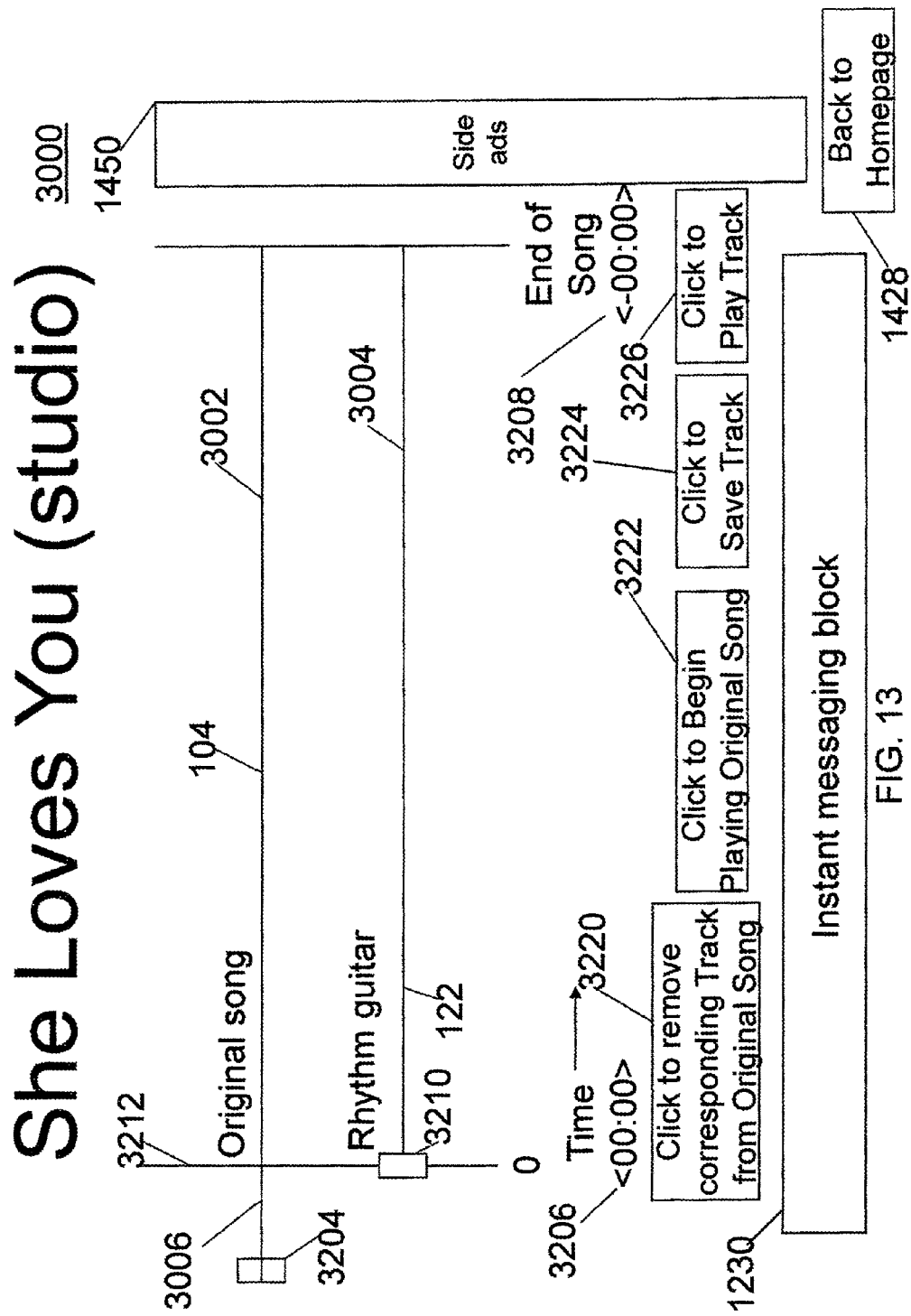
FIG. 13 is an exemplary GUI illustrating a timing graph for the song selected in FIG. 11.

In order for user 122 be prepared for the start of the original song, system 100 provides a count off prior to playing the original song. A timeline 3002 is generated for the original song and a separate timeline 3004 is generated for the selected track as shown in exemplary GUI 3000 in FIG. 13. Timeline 3002 includes an amount of time 3006 before the start of the original song in order to allow user 120 to prepare for the start of the original song.

Figure 14:
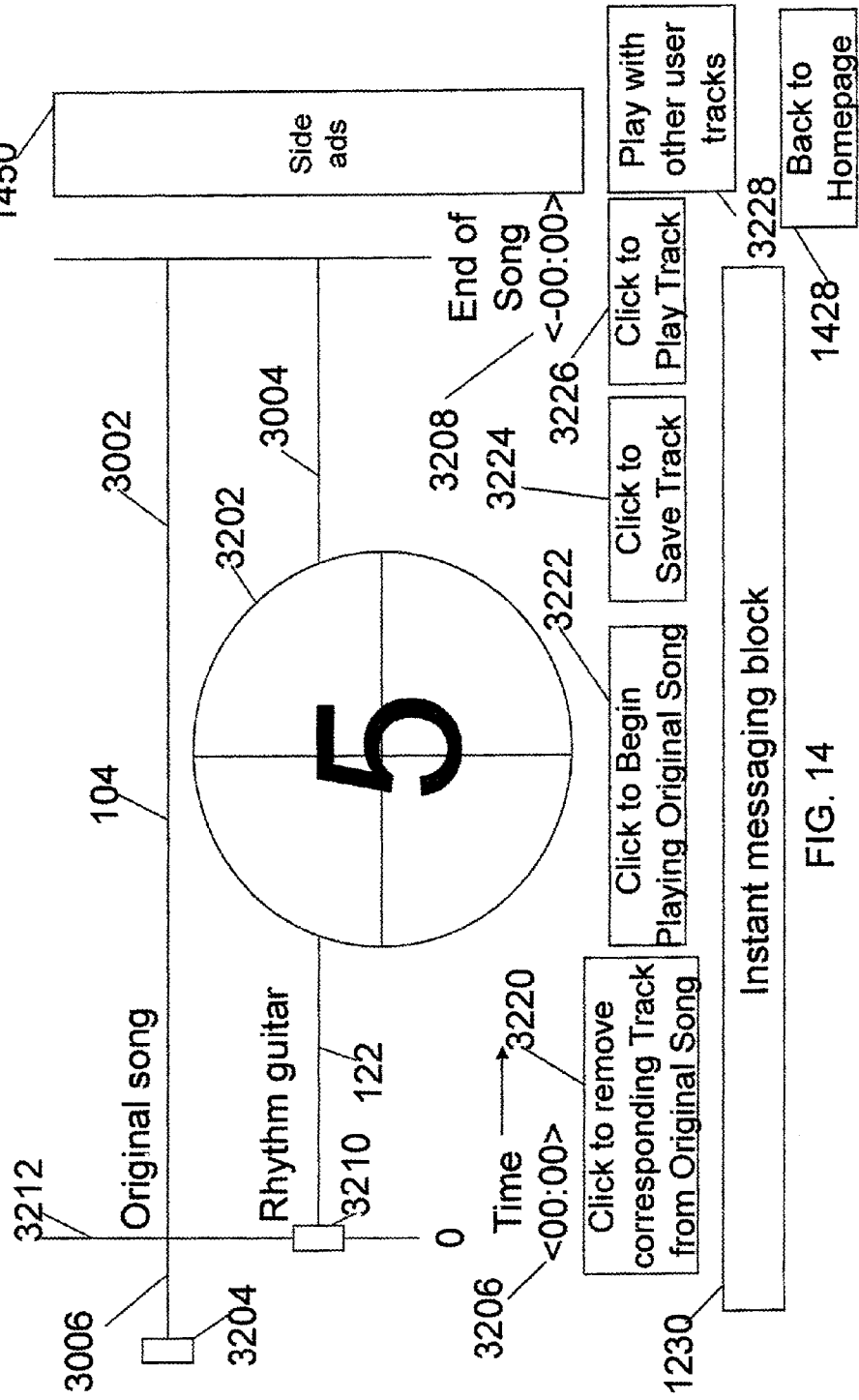
FIG. 14 is an exemplary GUI illustrating a countdown prior to beginning the recording of a track for the song selected in FIG. 11.

In an exemplary embodiment, shown in the exemplary GUI 3200 in FIG. 14, a visible counter 3202 may countdown seconds until the start of the original song. Exemplary GUI 3200 shows counter 3202 at 5 seconds before the start of original song. Alternatively, if system 100 detects the speed of the beat of the original song, the counter 3202 can be programmed to countdown in time with the beat of the song rather than a predetermined number of seconds.

A slider 3204 travels along timeline 3002 to give user 120 in indication of how long the original song has been playing and how much time is left in the original song. A first counter 3206 may count up the amount of time that the original song has been played and a second counter 3208 make countdown the amount of time remaining in the original song.

A slider 3210 travels along timeline 3004 in time with slider 3204 after slider 3204 reaches a "time zero" marker 3212 that denotes the start time of the original song. Track 122 begins recording contemporaneously with the start of song 104, even if user 120 does not begin playing until after song 104 starts playing. Further, track 122 records for the same length of time as the duration of song 104 so that track 122 parallels song 104.

For original songs that have a definitive ending, the recording of track 122 ends at the end of the original song 104. For songs that have an ending that slowly fades to zero volume, the slider 3210 continues beyond the end of the original song. For example, slider 3210 may continue for about 5 seconds beyond the end of the original song. This feature ensures that user 120 has recorded track 122 sufficiently long enough to allow track 122 to properly fade along with the original song 104.

System 100 can determine that an original song has a fadeaway ending by noting a decrease in the output volume of the original song over a time toward the end of the original song, such as about 10 seconds before the end of the original song. When user 120 mixes tracks for a song that fades to an ending, system 100 will "fade" the volume of the tracks toward the end of the song.

Optionally, when user 120 selects an original song 104 for which he/she desires to record a track 122, user 120 can "drop" the original of the track that user 120 desires to record. For example, if user 120 wants to record a drum track 122*g*, when user 120 is ready record to the song 104, user 120 can click button 3220, "Click to remove corresponding track from original song." If user 120 clicks on button 3220, original song 104 will be played without the corresponding original track.

When user 120 is ready to begin recording, user 120 can click on button 3222, "Click to begin playing original song", which begins the countdown described above. User 120 then records track 122 by playing along with original song 104. After recording track 122, user 120 is prompted to save track 122 by clicking on button 3224. Only track 122 is saved in database 106 under category 110*d* with a number that identifies a particular track recorded for that original song, user 120's username, and the file date that user 120 recorded track 122. Track 122 is not saved over top of the original song. Track 122 is saved in database 102 with a propriety file suffix, such as, for example, ".cvr," which can only be read by system 100. This prevents user 120 from being able to download any track 122 without purchasing the track.

Optionally, user 120 may be limited to the number of recorded tracks that can be saved for a particular song or instrument category. This prevents user 120 from monopolizing a particular song. For example, user 120 may be limited to eight tracks. If user 120 attempts to record a ninth track for a particular song or instrument category, system 100 can generate a notice that user 120 must first delete one of the eight previously recorded tracks.

Before track 122 is saved, user 120 can listen to track 122 with song 104 by pressing button 3226, "Click to Play Track." System 100 plays back song 104 and track 122 simultaneously, so that the beginning of track 122 coincides with the beginning of song 104. This enables user 120 to hear how his/her track 122 sounds with song 104. If user 120 likes the way that track 122 sounds, user 120 can save the track by clicking on button 3224.

Figure 15:
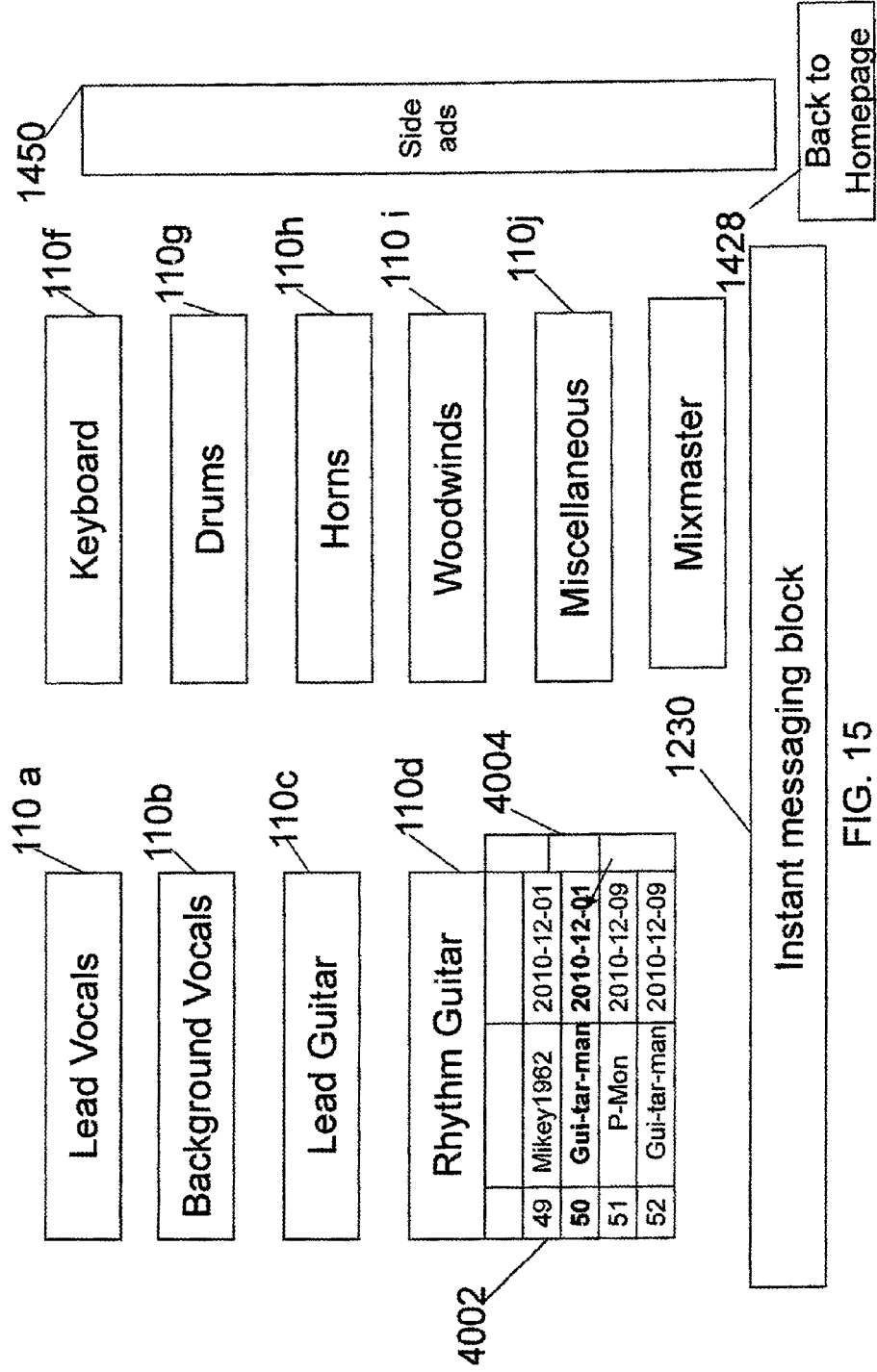
FIG. 15 is an exemplary GUI illustrating a list of previously recorded tracks for a particular instrument for the song selected in FIG. 11.

Alternatively, user 120 may want to listen to track 122 along with tracks made by other users of system 100, possibly, but not necessarily, including user 120. If so, user 120 selects button 3228, which in turn displays an exemplary GUI 4000, shown in FIG. 15. FIG. 15 illustrates all of categories 110*a-j* that are available for the selected song 104. User 120 selects a category 110*a-j* by clicking on the category heading. A drop down box 4002 appears that shows all of the recordings for that particular track. The recordings can be in the form of a spreadsheet with the recording number of the track in a first column, the username of the person who recorded the track in a second column, and the date on which it was recorded in a third column.

User 120 can search for a desired track 122*d* in the selected category 110 by typing in the track number, which represents the order in which that track was recorded for that category of song 104, a user name of a known user of system 100, or the date on which the track was recorded in the selected category 110. After user 120 types in the track number, the user name, or the title, system 100 searches for the track 122 associated with that information. If system 100 matches the search criteria with matching information in database 106, system 100 displays all of the tracks 122 matching the search criteria.

Alternatively, user 120 can simply scroll down the list of tracks using the scroll bar 4004 illustrated in FIG. 15. When user 120 gets to a track 122 that he desires, he clicks on that track, which is highlighted, as shown in FIG. 15. User 120 can select multiple tracks from each category by clicking on the button listing the category name after user 120 has already selected at least one track from that category.

If desired, user 120 can then go through other categories 110*a-j*, repeating the process until all desired tracks 122 have been selected. In the exemplary embodiment illustrated in exemplary GUI 4100 FIG. 16, user 120 has selected track 68 from category 110*a* (lead vocals), track 79 from category 110*b* (background vocals), track 121 from category 110*c* (lead guitar), track 50 from category 110*d* (rhythm guitar), track 69 from category 110*e* (bass), and track 12 from category 110*g* (drums). An exemplary file arrangement of the selected tracks is illustrated in exemplary GUI 4200 shown in FIG. 16A.

Alternatively, if user 120 does not desire to individually select tracks to mix with his/her own track 122, user 120 can allow system 100 to select tracks. For example, if user 120 has previously recorded a drum track, system 100 can randomly add vocals for the particular song. Alternatively, user 120 can set criteria for the selection of other tracks. For example, user 120 can select categories such as all-male, all female, US only, etc. User 120 can click on button 4104 to allow system 100 to display the categories (not shown).

Figure 17:
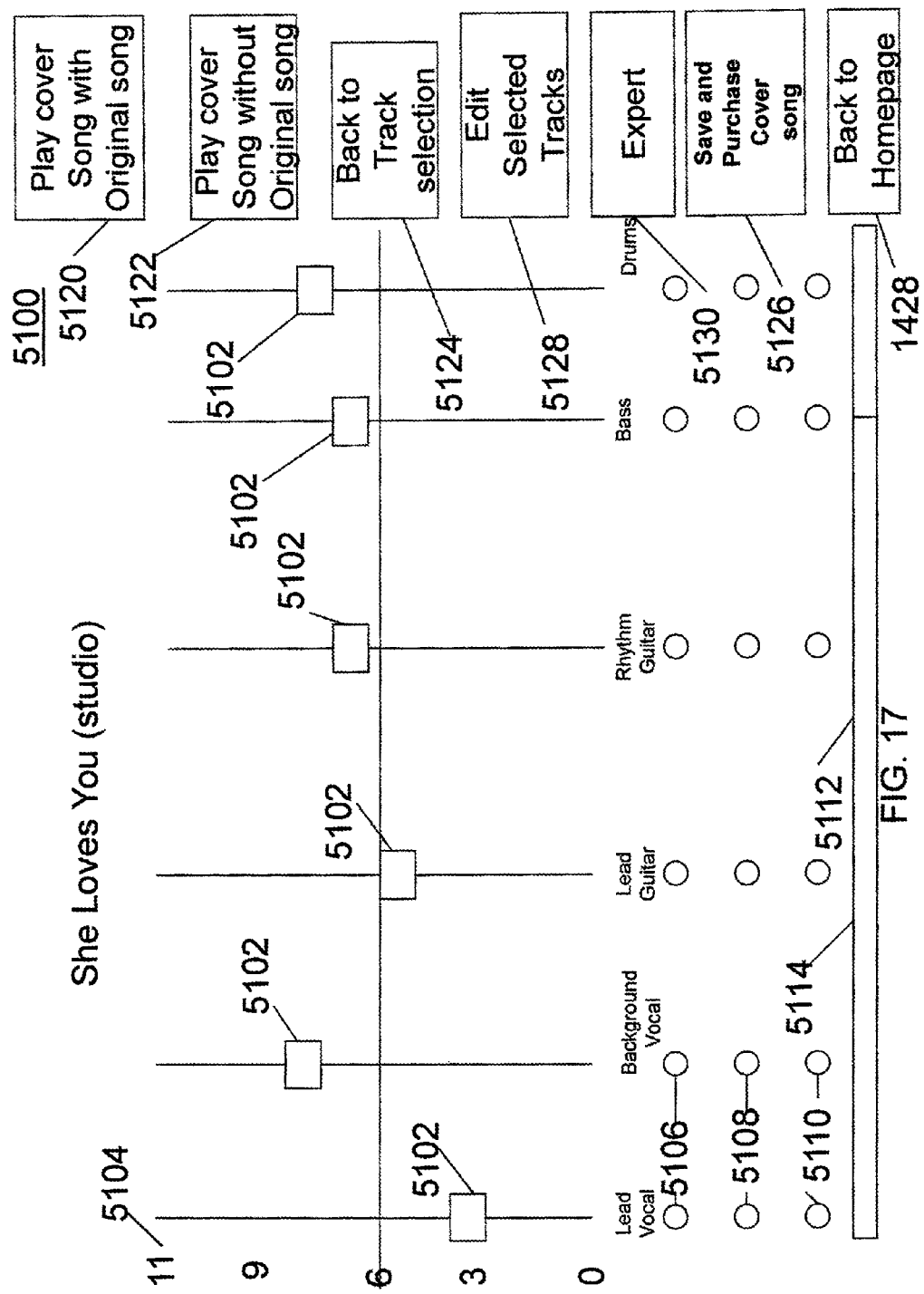
FIG. 17 is an exemplary GUI of a mixing board used to mix the tracks selected in GUI illustrated in FIG. 16.

After user 120 has selected all desired categories, user 120 clicks on "Mixmaster" button 4106 to mix the tracks together to form a cover song. After clicking on button 4106, an exemplary GUI 5100, shown in FIG. 17 is displayed. GUI 5100 is a virtual mixing board that allows user 120 to adjust the relative sound levels of each of selected tracks 122*a*, 122*b*, 122*c*, 122*d*, 122*e*, and 122*g* to desired levels. Slider bars 5102 can be manipulated up and down a scale to indicate relative volumes of each track. A scale 5104 on the left-hand side of GUI 5000 provides relative numbers for volume adjustment.

Additionally, knobs 5106, 5108, 5110 beneath each scale can be adjusted to adjust the amount of treble, bass, and reverb, respectively, for each individual track. If the number of selected tracks exceed the number that can be displayed on the screen at one time, a slider bar 5112 can be displayed at the bottom of GUI 5100 to enable user 120 to slide a slider 5114 on slider bar 5112 to see the scales for all of the selected tracks. After user 120 has selected all of the sound levels for the different tracks 122*a-n*, user 120 can play all of the selected tracks. User 120 can select button 5120 to play all of the selected tracks 122 with the original song. Alternatively, user 120 can select button 5122 to play just the selected track(s) 122 to play without the original song. While user 120 is in the listen mode, an audible tone is periodically generated by system 100 to be heard along with selected tracks 122. The tone will frustrate user 120 from recording the plurality of tracks 122 with another device, such as a tape recorder, so that user 120 cannot benefit from mixing his/her own cover song without paying for it.

Figure 16:
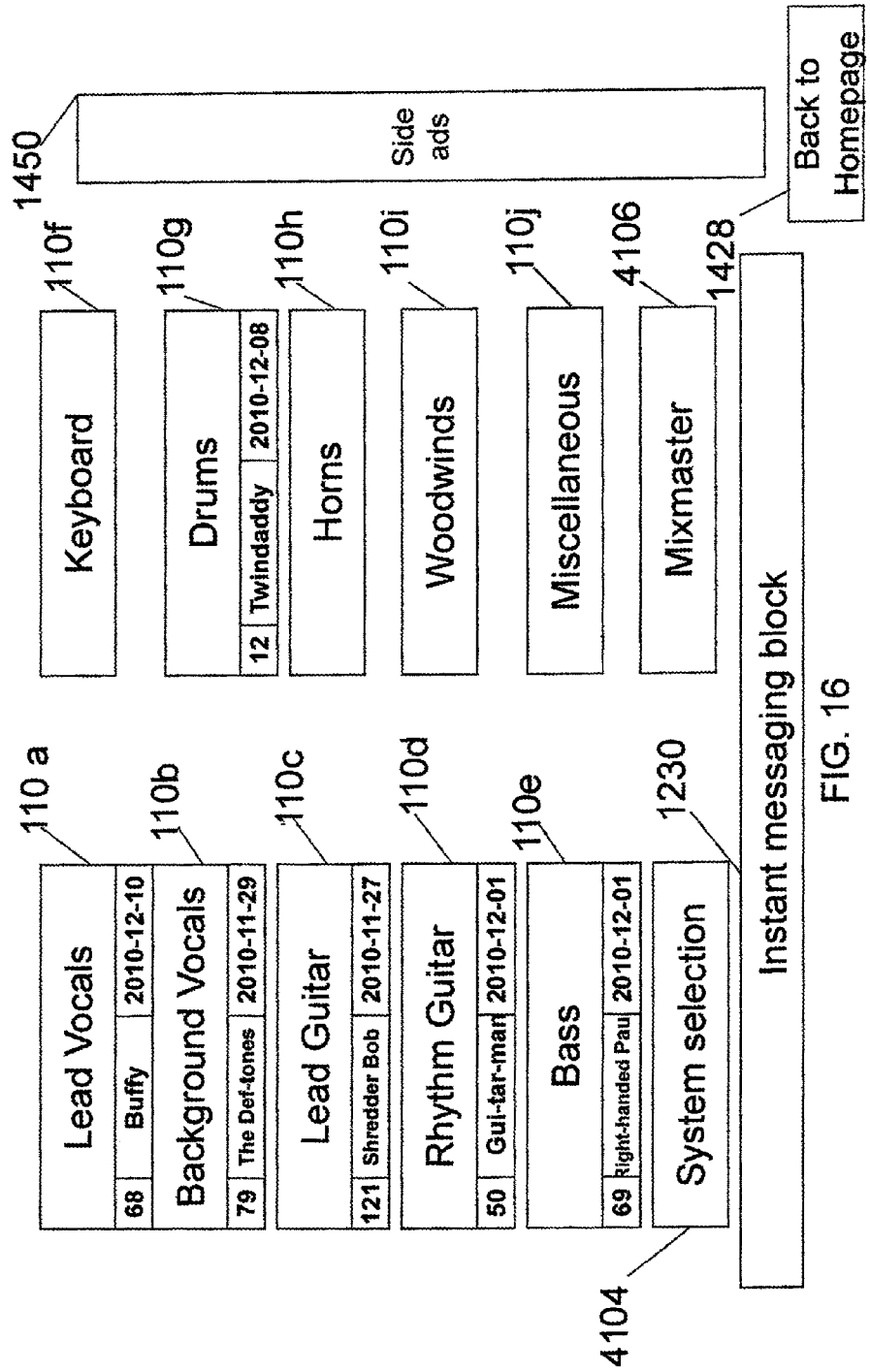
FIG. 16 is an exemplary GUI illustrating a list of a selected track for each of a plurality of instruments previously recorded for the song selected in FIG. 11.
Figure 16A:
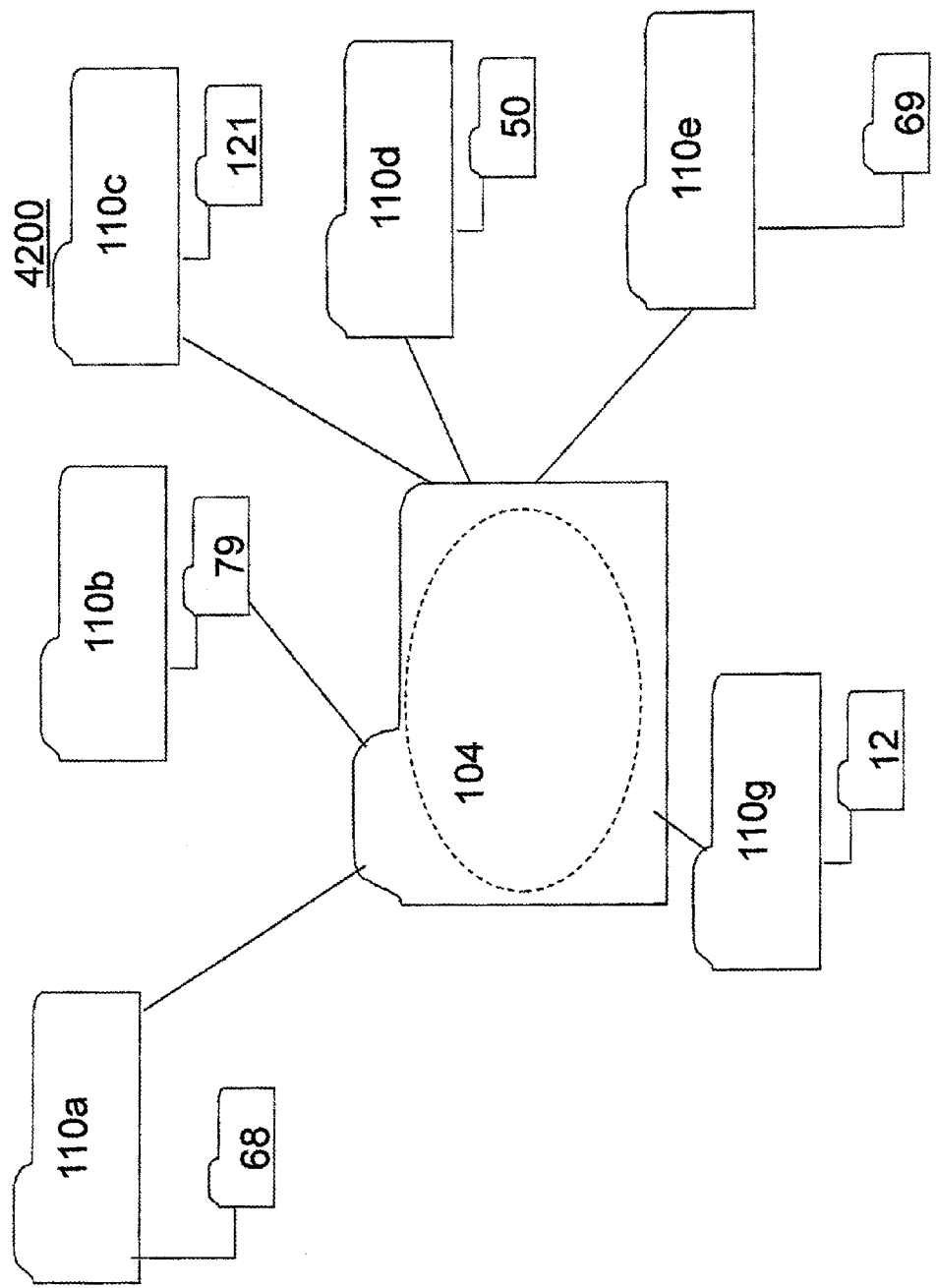
FIG. 16A is an exemplary GUI illustrating file locations of each of the selected tracks in FIG. 16.

If, after listening to the song, user 120 would like to use a different track or add additional tracks, user 120 can select button 5124, which takes user 120 back to GUI 4100, shown in FIG. 16. If user 120 desires to remove a track, user 120 can click on that particular track and hit the "delete" button on his/her keyboard interface. If user 120 decides to add additional tracks from a particular track category, such as for example, category 110g for drums, user 120 can click on the button for drum track 110g again, which will keep the selected from track (in this example, drum track 12) at the top of the drop-down menu and allow user 120 to select an additional drum track in the same manner as the original drum track was selected.

When user 120 has added the tracks 122 that he/she desires to be part of the cover version of song 104, user 120 clicks on the "save cover song" button 5126 to save the song to database 102 in system 100. System 100 takes the selected tracks and combines them into a file that is saved in database 102 under the title of the original song.

Figure 18:
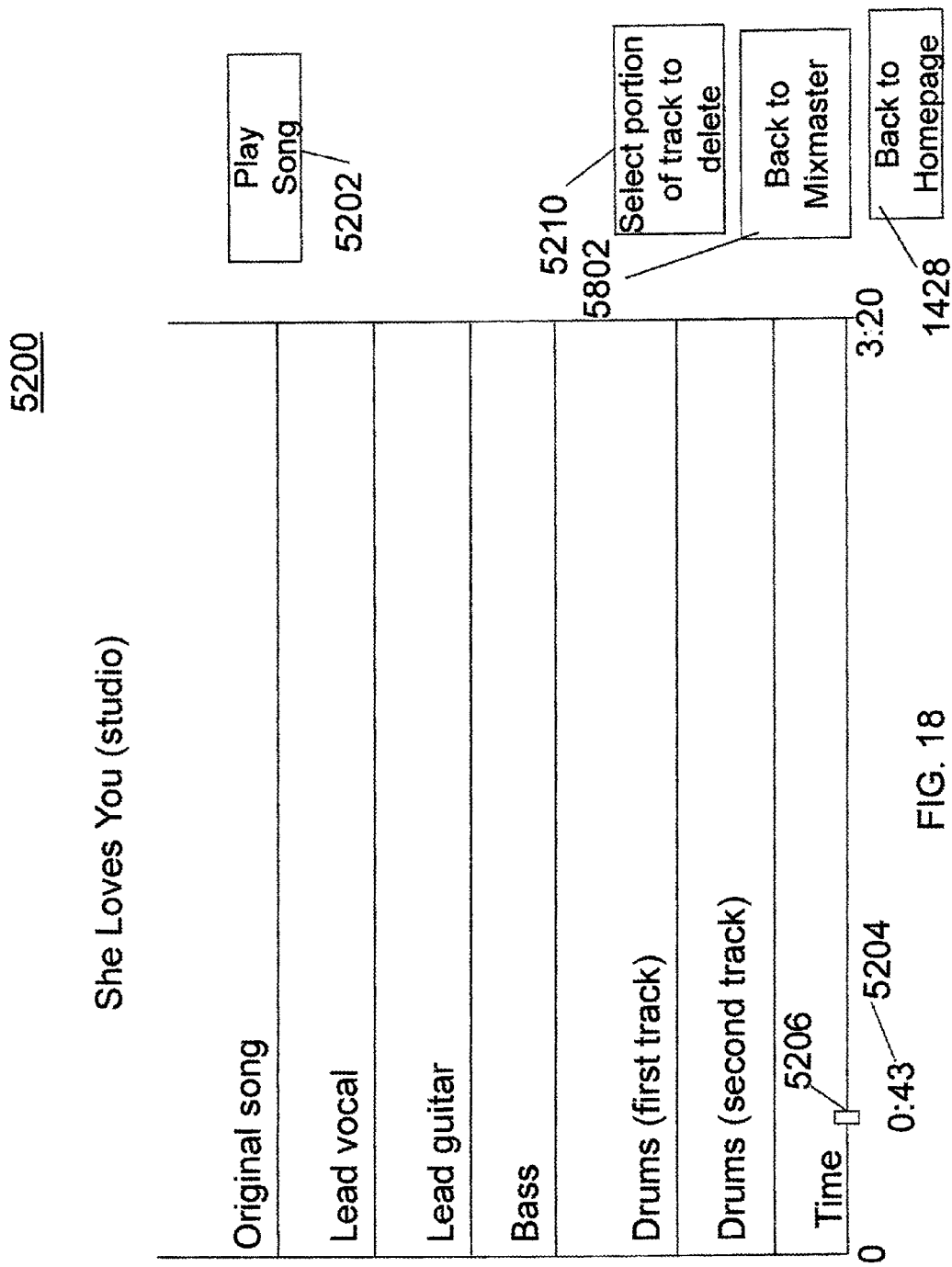
FIG. 18 is an exemplary GUI illustrating a timing graph for editing each of a plurality of previously recorded tracks for a song.
Figure 19:
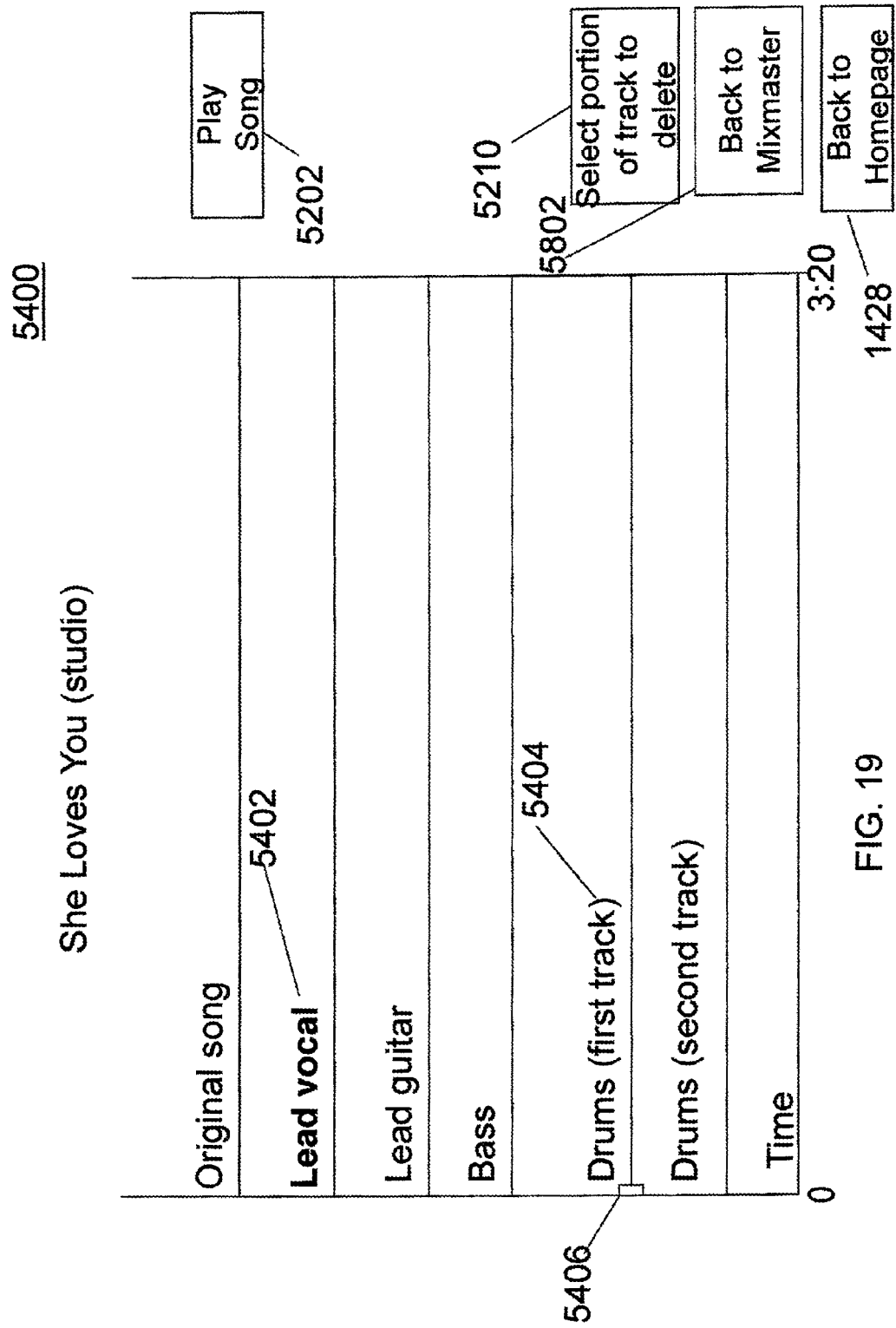
FIG. 19 is an exemplary GUI illustrating a selected track of the tracks illustrated in FIG. 18.
Figure 20:
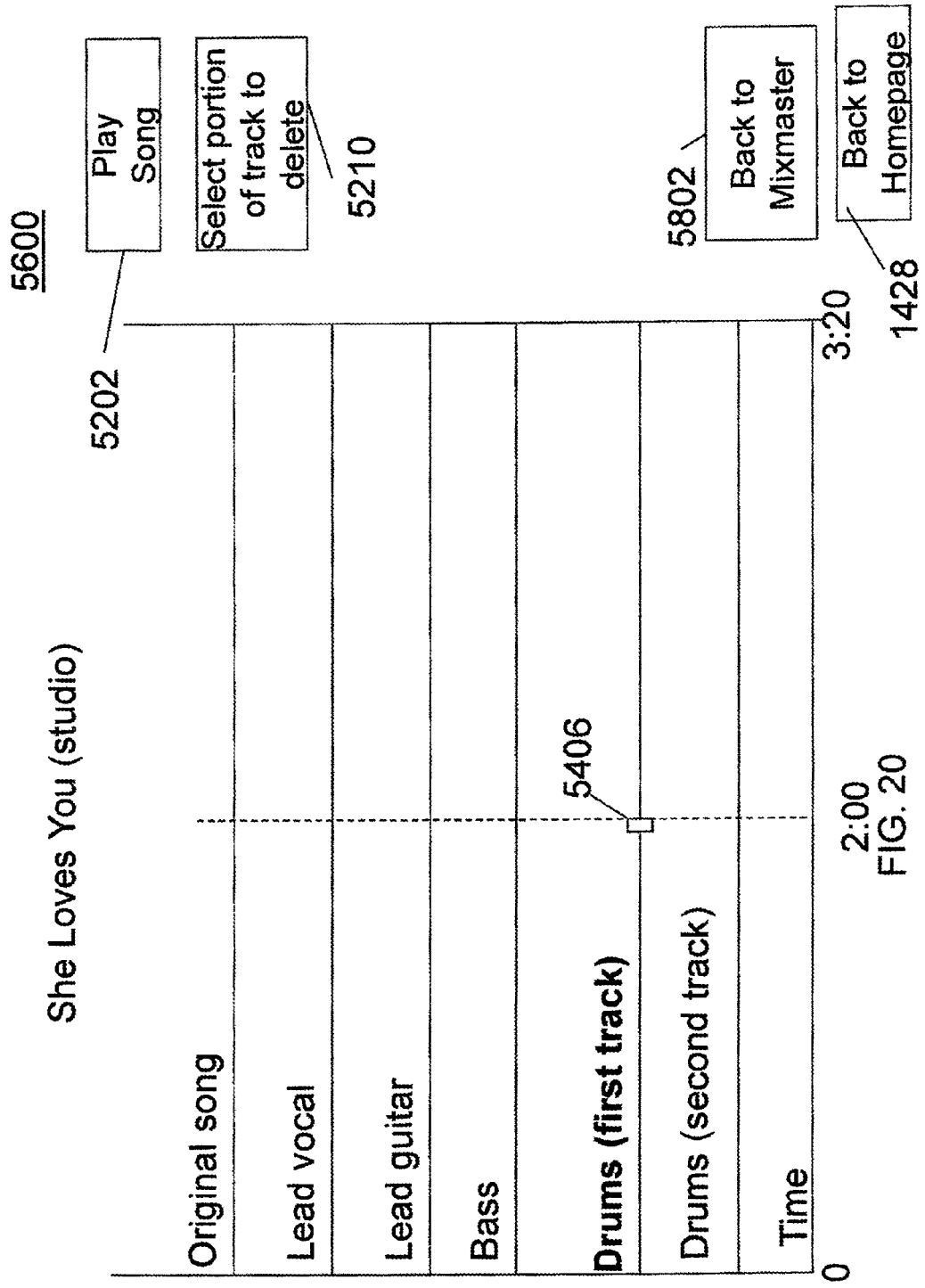
FIG. 20 is an exemplary GUI illustrating a selected track to be edited from the tracks illustrated in FIG. 18
Figure 21:
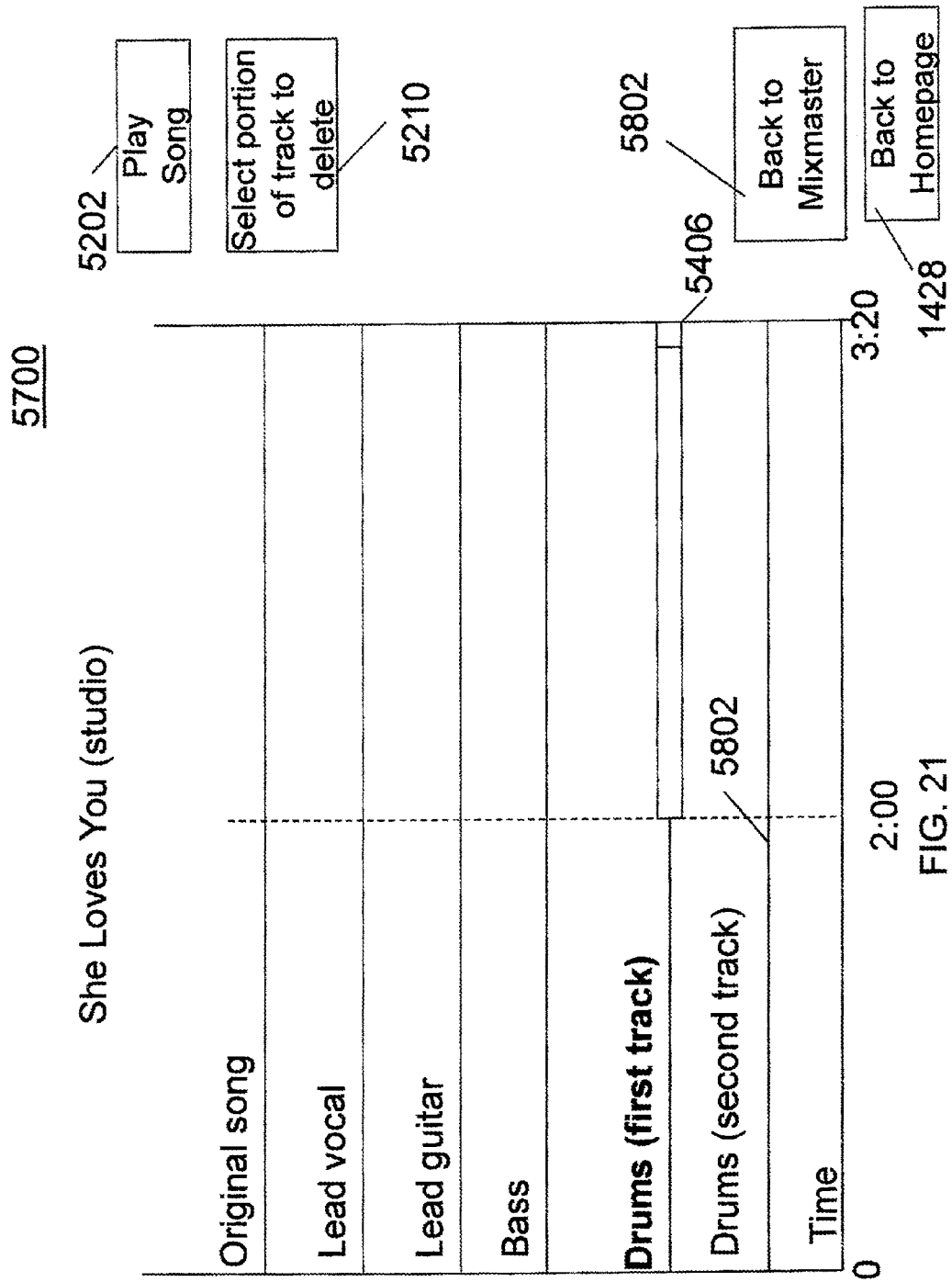
FIG. 21 is an exemplary GUI illustrating a portion of time of the selected track from FIG. 20 to be deleted.

Additionally, if user 120 likes a first portion of one type of a track and a second portion of another of the same type of track, user 120 can "splice" the desired portions of the two tracks together to form a single track. For example, if user 120 is covering a song that is 3 min. and 20 seconds in length and user 120 likes the first 2 min. of a particular drum track and the last minute and 20 seconds of a different drum track, user 120 can select both drum tracks and record them with the other selected tracks. User 120 can then click on button 5128, which generates an exemplary GUI 5200, shown in FIG. 18 and click button 5202 to play the song with all of the selected tracks. The original song and all of the selected cover tracks will play and a timer 5204, shown at the bottom of FIG. 18 will count, with a slider 5206 sliding along a "timer" track along with timer 5204 that indicates the amount of time that the song has been playing. If user 120 desires to remove a part of a track, user 120 clicks on button 5210, which highlights the first cover track 5402, in this case the lead vocal track, as shown in exemplary GUI 5400 shown in FIG. 19. User 120 can scroll down the tracks until user 120 gets to the desired track to delete, in this case "drums (first track)" 5404. A slider button 5406 appears at the beginning of the timeline for the selected track. User 120 can click on slider button 5406 and move slider button 5406 to a desired time, as shown in exemplary GUI 5600 shown in FIG. 20. User 120 can double-click on the desired time to lock slider button 5406 in place. User 120 can then move the slider button 5406 to a desired end time and then click on the desired end time to select the length of time to be cut, as shown in GUI 5700 in FIG. 21.

Figure 22:
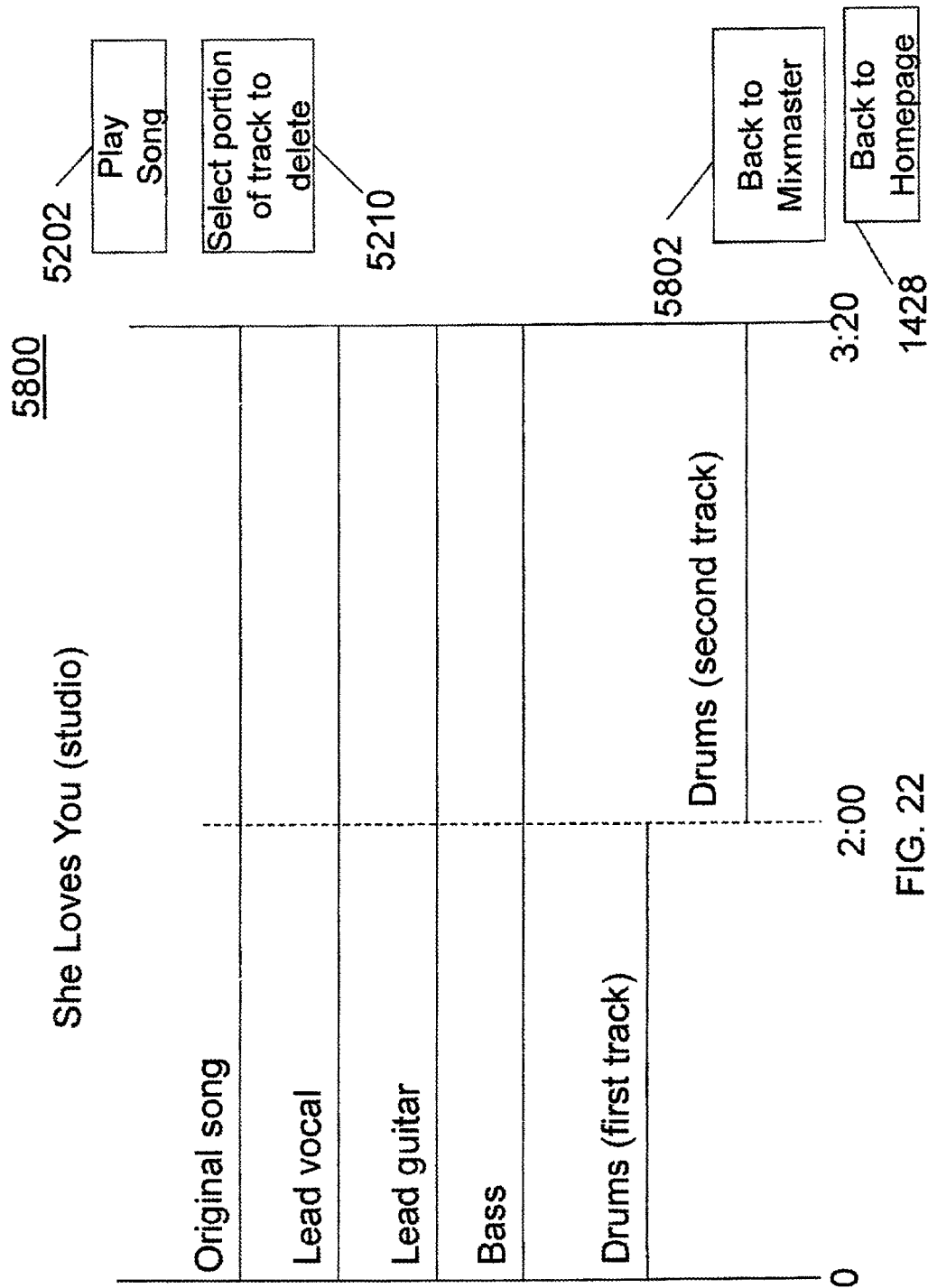
FIG. 22 is an exemplary GUI illustrating selected tracks with a portion of a first drum track and another portion of a second drum track used to form the entire drum track.

Similarly, as shown in an exemplary GUI 5800 shown in FIG. 22, user 120 can select additional track, in this case "drums (second track)" 5802 and repeat the process for deleting a portion of track 5802, resulting in a cover song that includes a first drum track for the first two minutes of the song and a second drum track for the remainder of the song. After user 120 has selected the tracks, user can click on button 5802 to return back to GUI 5100, shown in FIG. 17.

Figure 23:
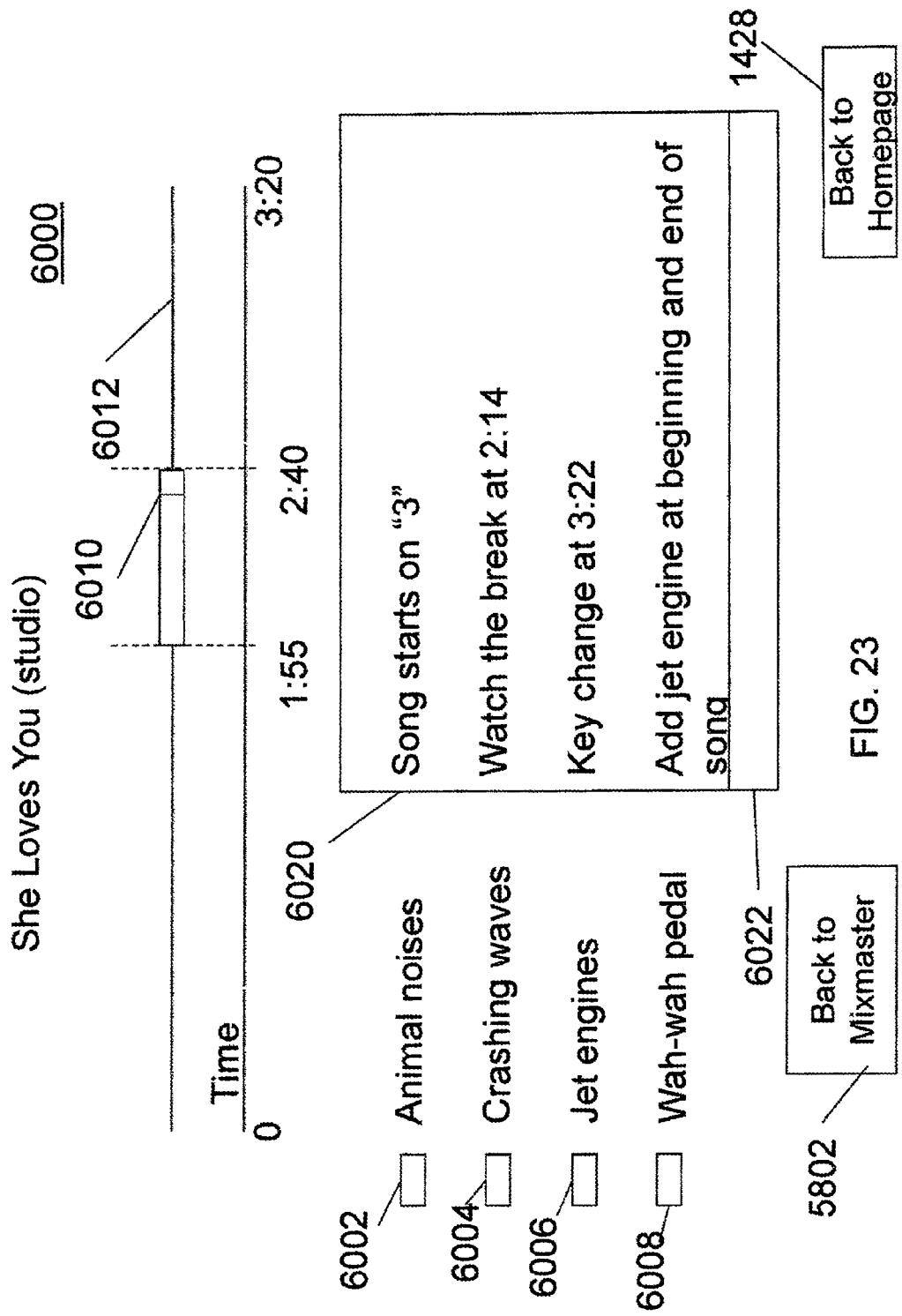
FIG. 23 is an exemplary GUI illustrating audio effects and comments used to mix the tracks selected in FIG. 22.

Additionally, an "Expert" button 5130 can be clicked to generate an exemplary GUI 6000, shown in FIG. 23. GUI 6000 displays a variety of effects that can be added during mixing of tracks. For example, sound effects 6002-6006 such as animal noises, crashing waves, jet engines, etc. can be selected. Alternatively, other effects, such as guitar wah-wah pedals 6008 and the like can be selected. User 120 selects the effect as well as the time duration of the effect through the song by manipulating a slider 6010 on timeline 6012. Further, GUI 6000 includes a "tips and tricks" window 6020 that includes blog-style comments generated by other system users for the particular song. For example, comments can include such comments as "song starts on "3""; "watch the break at 2:14"; "key change at 3:22"; and "add jet engine at beginning and end of song". Additionally, a sub window 6022 at the bottom of window 6020 allows user 120 to add his own comments for others to view. After user 120 has entered all of the desired effects, user 120 clicks on the "Back to Mixmaster" button 5802, which reverts back to GUI 5100, shown in FIG. 17.

Alternatively, user 120 can select tracks 122 that form a cover song, but omit the track for the instrument that user 120 plays. User 120 can play the selected tracks 122 and play along with his/her instrument. This allows user 122 "practice" the cover song, while being the only provider of his/her particular instrument track.

In an exemplary embodiment, the original song has a time duration, such as, for example, 3 minutes and 5 seconds, and each of the tracks 122 associated with the original song has the same time duration, such as, for example, 3 minutes and 5 seconds, so that, when the original song and/or a selection of tracks 122 are played, each track 122 can easily be synchronized with the original song and/or with each other during the mixing process.

Alternatively, the original song has a start time and each track 122 has the same start time so that, during mixing, the start of the original song and/or tracks 122 can be synchronized. For example, if the guitar portion of a song begins at the start of the song and ends 3 minutes and 10 seconds after the start of the song, but the vocal portion of the song begins 20 seconds after the start of the song and ends 2 minutes and 50 seconds after the start of the song, the vocal track does not have to be 3 minutes and 10 seconds long. The vocal track can be as short as 2 minutes and 50 seconds long. Both the guitar track and the vocal track begin at the start of the song, with the vocal track being basically "dead air time" for the first 20 seconds until it is time for the vocals to actually begin. Then, after the vocals end (in this example, 2 minutes and 50 seconds after the song begins), the vocal track can end.

Further, after listening to the selected tracks 122, user 120 can save and purchase the cover song that was generated by the selected tracks 122. User 120 presses "Save and Purchase Cover song" button 5126 on GUI 5100 to purchase the cover song generated by tracks 122. System 100 converts tracks 122 from the proprietary (.cvr) suffix to a commercially available suffix, such as, for example, .mp3 or .m4a, so that user 120 can copy the song onto other electronic media. The song is saved in the "My tunes" box 1156 in GUI 1162 shown in FIG. 5. The song title can be printed differently than saved tracks to distinguish a complete cover song from individual cover tracks. For example, although not shown, the song title can be printed in bold text while the individual cover tracks can be printed in normal text.

While user 120 has been described as the party selecting and mixing tracks together, those skilled in the art will recognize that any third-party user can select and mix tracks to form a cover song. Referring to FIG. 1, a third party user 131 can access system 100 via the Internet 103 in order to select and mix tracks that were recorded by others.

Figure 23A:
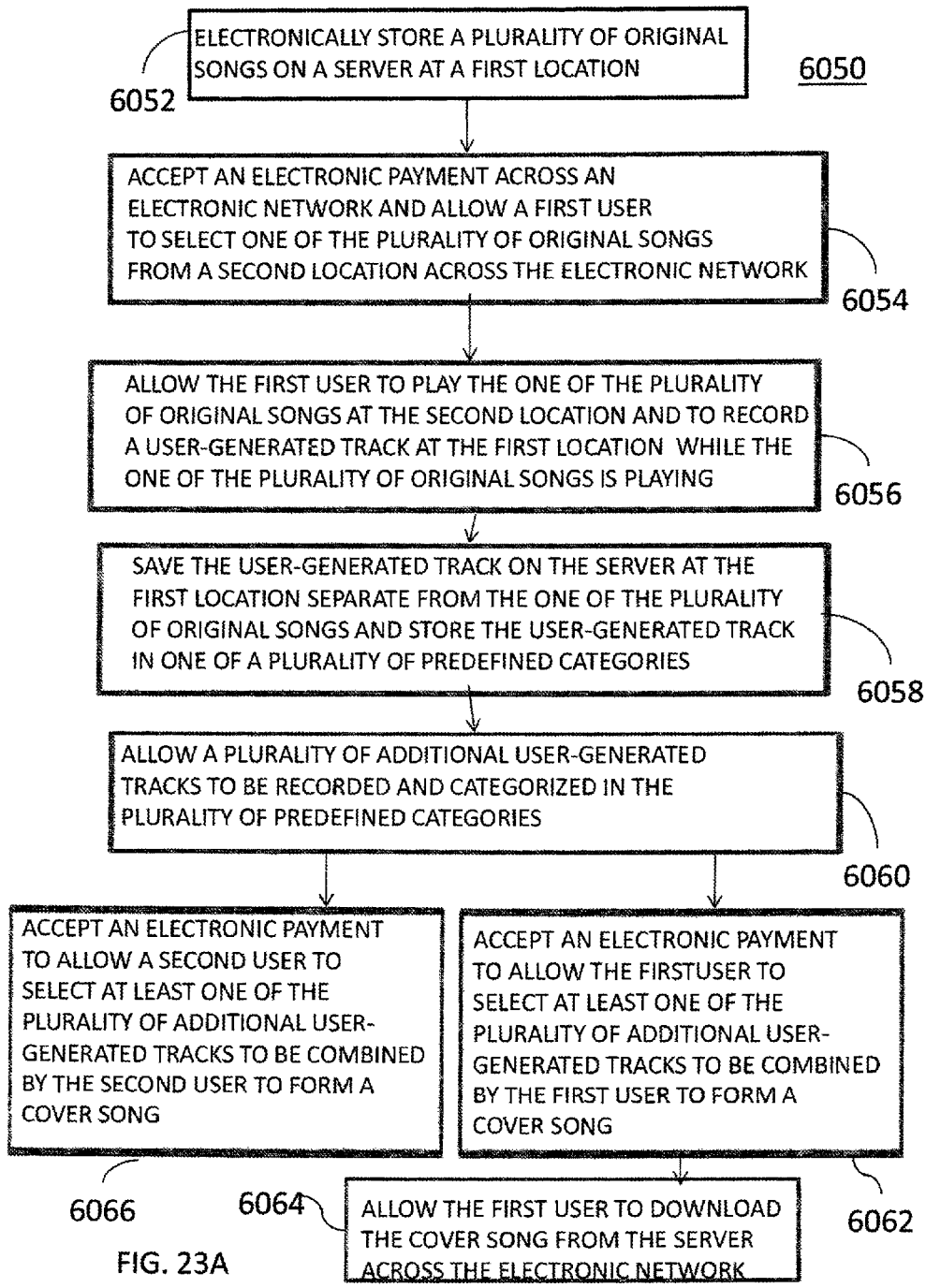
FIG. 23A is exemplary flowchart illustrating a method of forming a cover song according to an exemplary embodiment of the present invention.

An exemplary flowchart 6050, shown FIG. 23A, illustrates an exemplary flow of the operations of system 100. In step 6052, a plurality of original songs are electronically stored on server 102 at a first location, such as were server 102 is located. In step 6054, system 100 except electronic payment across an electronic network 103, such as, for example the Internet, and allows user 102, from a second location, such as, for example the user's home, to select one of the plurality of original songs 104 from the server location across electronic network 103. In step 6056, system 100 allows user 120 to play one of the plurality of original songs 104 at the second location and to record a user generated track 122 on to server 102 at the first location while the one of the plurality of original songs 104 is playing. In step 6058, user 120 has the ability to save the user-generated track on to server 102 point database within server 102 that is separate from the one of the plurality of original songs and to store the user-generated track 122 in one of a plurality of predefined track categories 110a-110j. Next, in step 6060, system 100 allows a plurality of additional user-generated tracks 122 to be recorded onto server 102 and categorized accordingly in the plurality of predefined tracks categories 110a-110j. In step 6062, system 100 accepts an electronic payment from user 120 to allow user 120 to select at least one of the plurality of additional user hyphenated generated tracks 122 can be combined by user 122 formed a cover song. Instead 6064, system 100 allows user 122 download the cover song from server 102 across electronic network 103. Alternatively, in step 6066, instead of user 120 forming the cover song, system 100 can accept electronic payment from an alternative user 120' to allow the alternative user 120' to select at least one of the plurality of additional user hyphenated generated tracks to be combined by the alternative user 120' to form a cover song.

Figure 24:
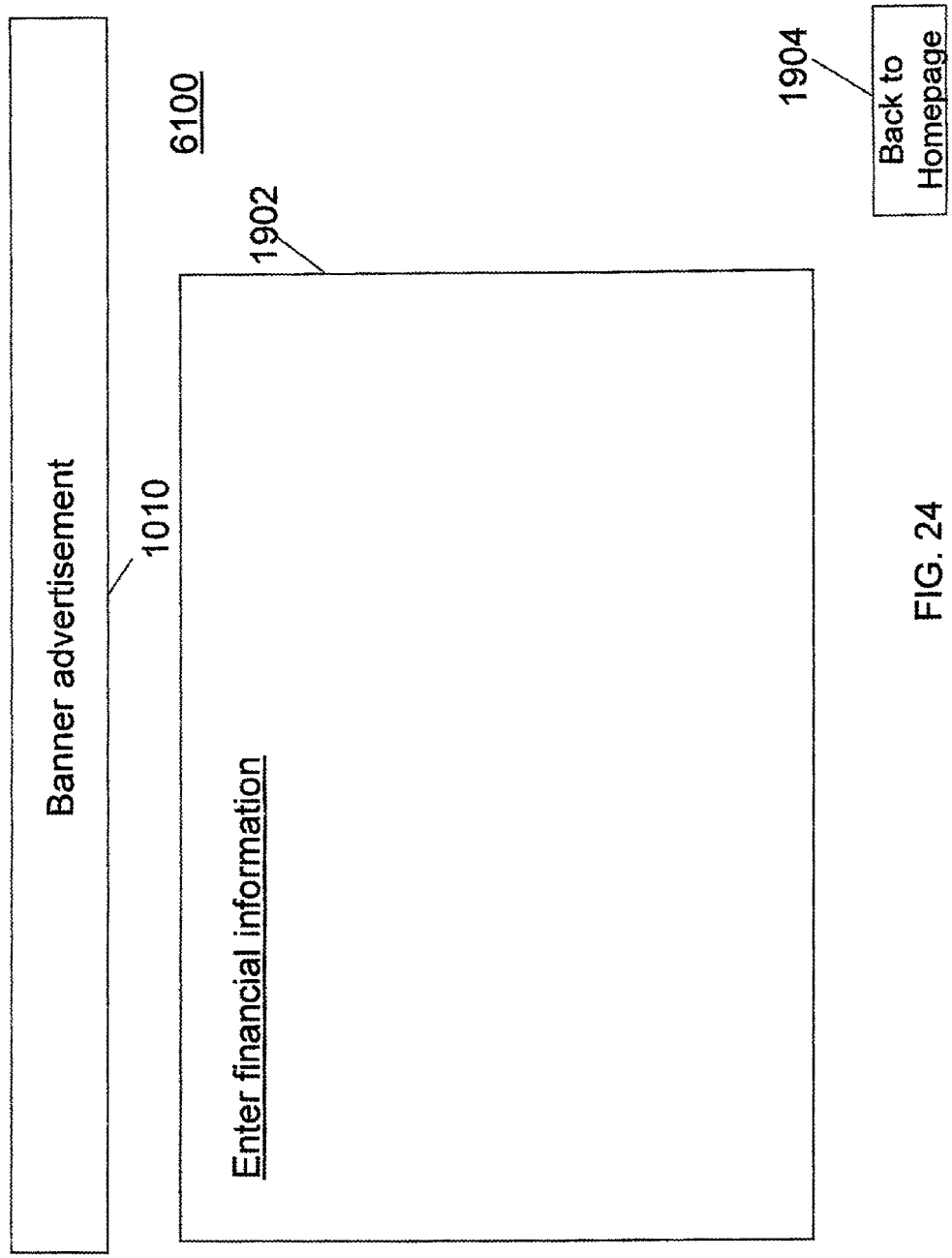
FIG. 24 is an exemplary GUI illustrating financial information required for user to use the system of the present invention.

Referring back to FIG. 6, clicking on block 1218 generates an exemplary GUI 6100, shown in FIG. 24. This allows user 120 to "load" money into a user account in a payment acceptance module 1903 (shown in FIG. 1) electronically connected to database 102 that can be used to purchase songs, equipment, services, and other aspects of system 100. This allows user 122 make purchases without having to continually provide financial information. The user account allows user 120 to set a dollar limit on the account so that user 120 does not overcharge the account.

User 120 can link his/her user account to a credit card or a bank account by known methods, such as for example, the methods used to set up a PayPal account. After user 120 has provided the requested information in block 1902, user 120 can click on block 1904 to return to homepage 1200 shown in FIG. 6.

Additionally, after listening to the selected tracks 122, user 120 has the option of rating individual tracks 122. An exemplary rating system of between one star (for a satisfactory performance) and five stars (for an exceptional performance) can be provided to any one track 122, for example, one time per username. When a track 122 receives a predetermined number of stars, such as, for example, fifty (50) stars, the author of that track 122 will be awarded stars that can be used to purchase items, such as, for example, songs or hardware, through system 100. Additionally, stars can be awarded based on the number of times that a particular user's tracks 122 are used to form cover songs.

Figure 25:
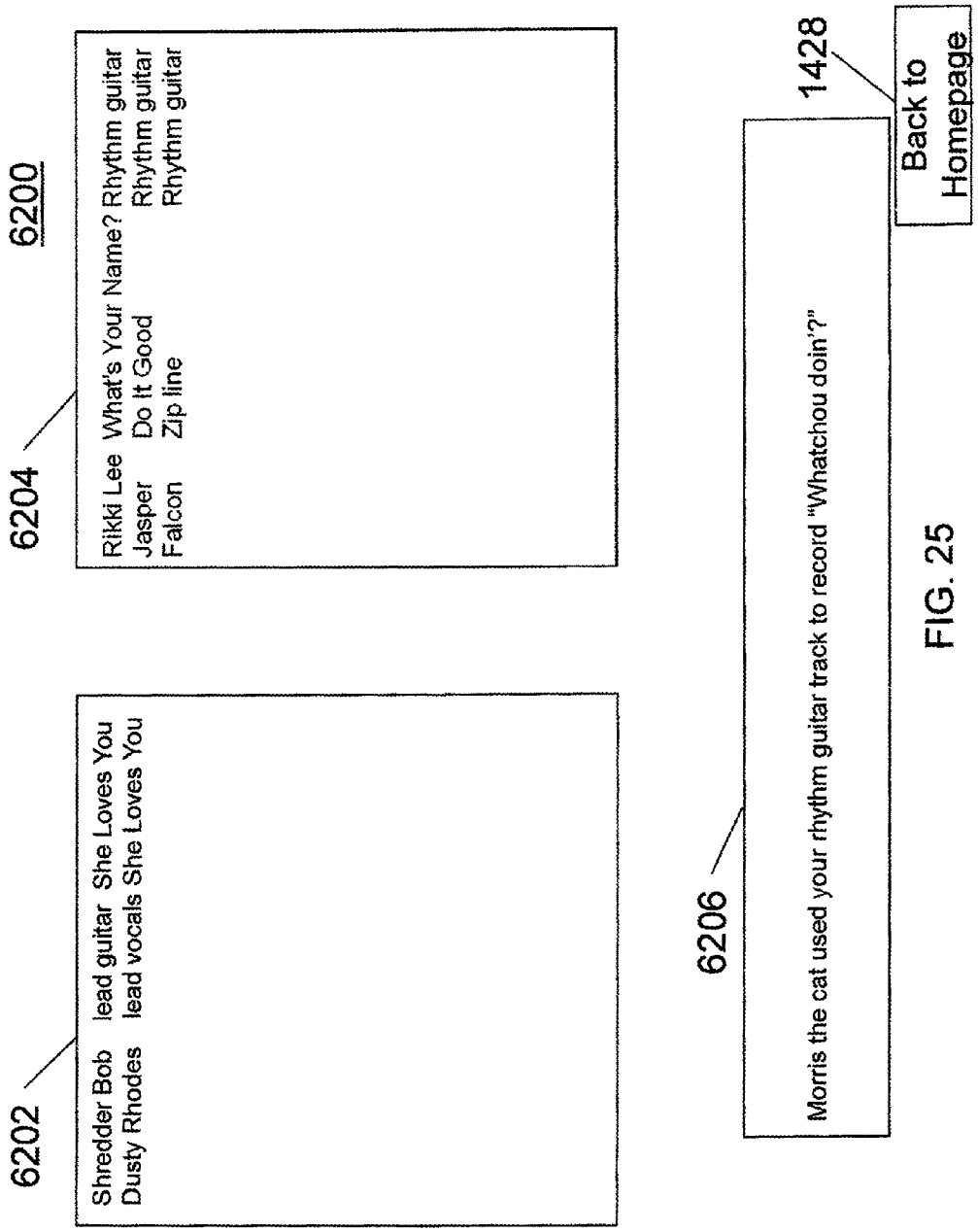
FIG. 25 is an exemplary GUI illustrating information provided to a user of the inventive system regarding other users' use of the inventive system.

Referring back to FIG. 6, user 120 can click on block 1220 to view information about and correspond with "bandmates". A bandmate is a person whose tracks user 120 has used to mix a song or a person who has used a track generated by user 120 to mix their own song. Clicking on block 1220 generates an exemplary GUI 6200, shown in FIG. 25.

Block 6202 lists the user names of all users whose tracks user 120 has used to record cover songs, along with the title of the song and the type of track (i.e., rhythm guitar, bass, drums, etc.) that user 120 has recorded. Block 6204 lists the names of all users who have used tracks generated by user 120, along with the title of the song and the type of track that user 120 recorded. Block 6206 lists notifications to user 120 regarding which users have recently used tracks generated by user 120 to record a cover song. To return to user's homepage, user 120 clicks on block 1428.

Figure 5:
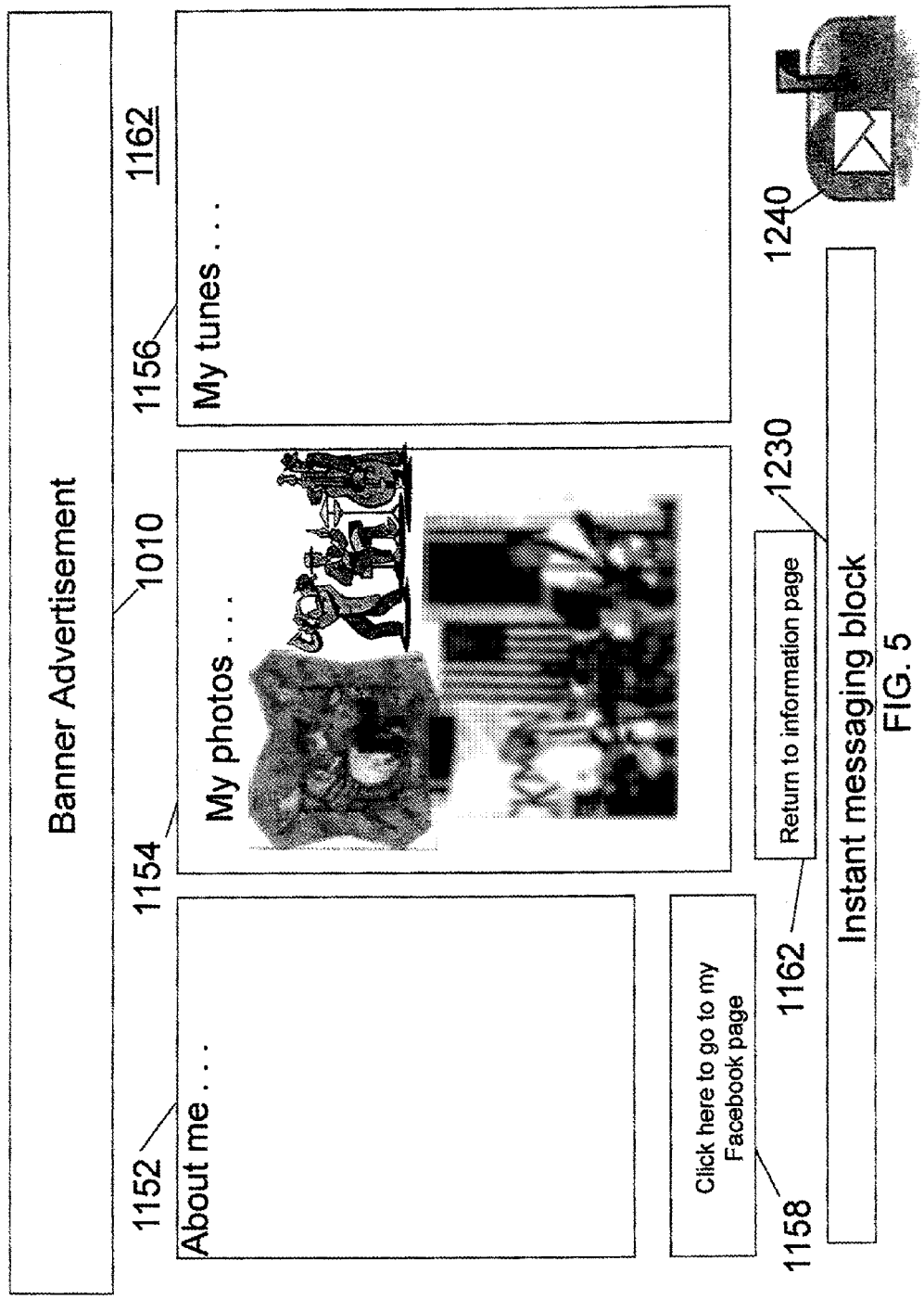
FIG. 5 is an exemplary GUI for a supplemental user information page for the system of FIG. 1.
Figure 26:
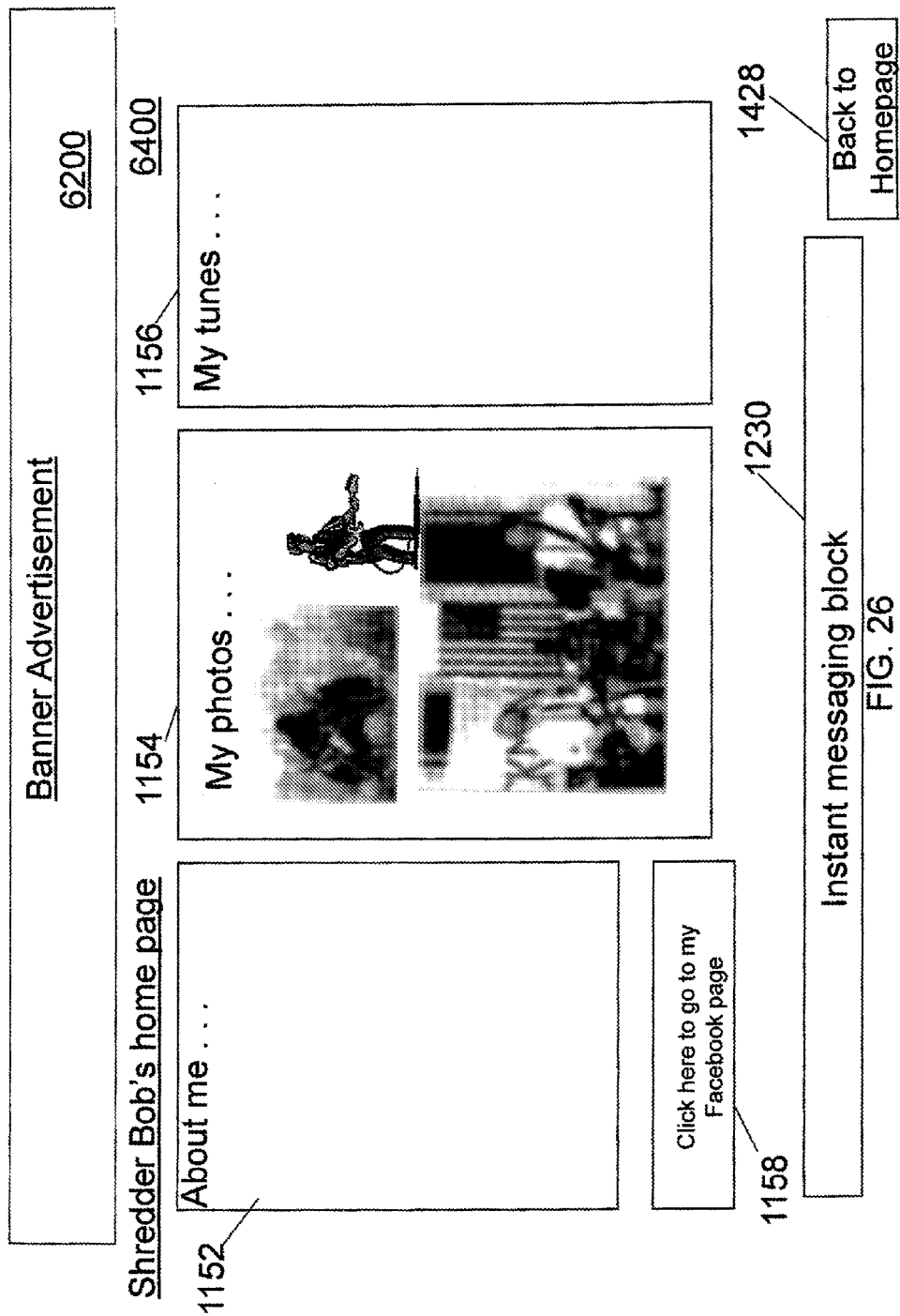
FIG. 26 is an exemplary GUI illustrating another user's homepage.

If user 120 clicks on the username of a bandmate, the personal information provided by the bandmate is shown to user 120 in exemplary GUI 6400 shown in FIG. 26, which is similar in format to GUI 1162 shown in FIG. 5. To return to user's homepage, user 120 clicks on block 1428.

Additionally, cover songs an also be rated by user 120 in the same manner as track 122. When a cover song receives a predetermined amount of stars, the cover song can be featured in a "virtual concert" with other cover songs. System 100 can advertise the date and time of the concert in a banner advertisement throughout the various GUI that user 120 scrolls through while using system 100 or, alternatively, system 100 can transmit a mass e-mail or other electronic message to all members of system 100 based on user accounts, which include an email address for all users 120. Further, system 100 may transmit a specialized message or e-mail to the member(s) whose songs and/or tracks are being played in the concert. User 120 who submitted his/her cover song for play at the concert will be provided an opportunity to "name" the band.

Figure 27:
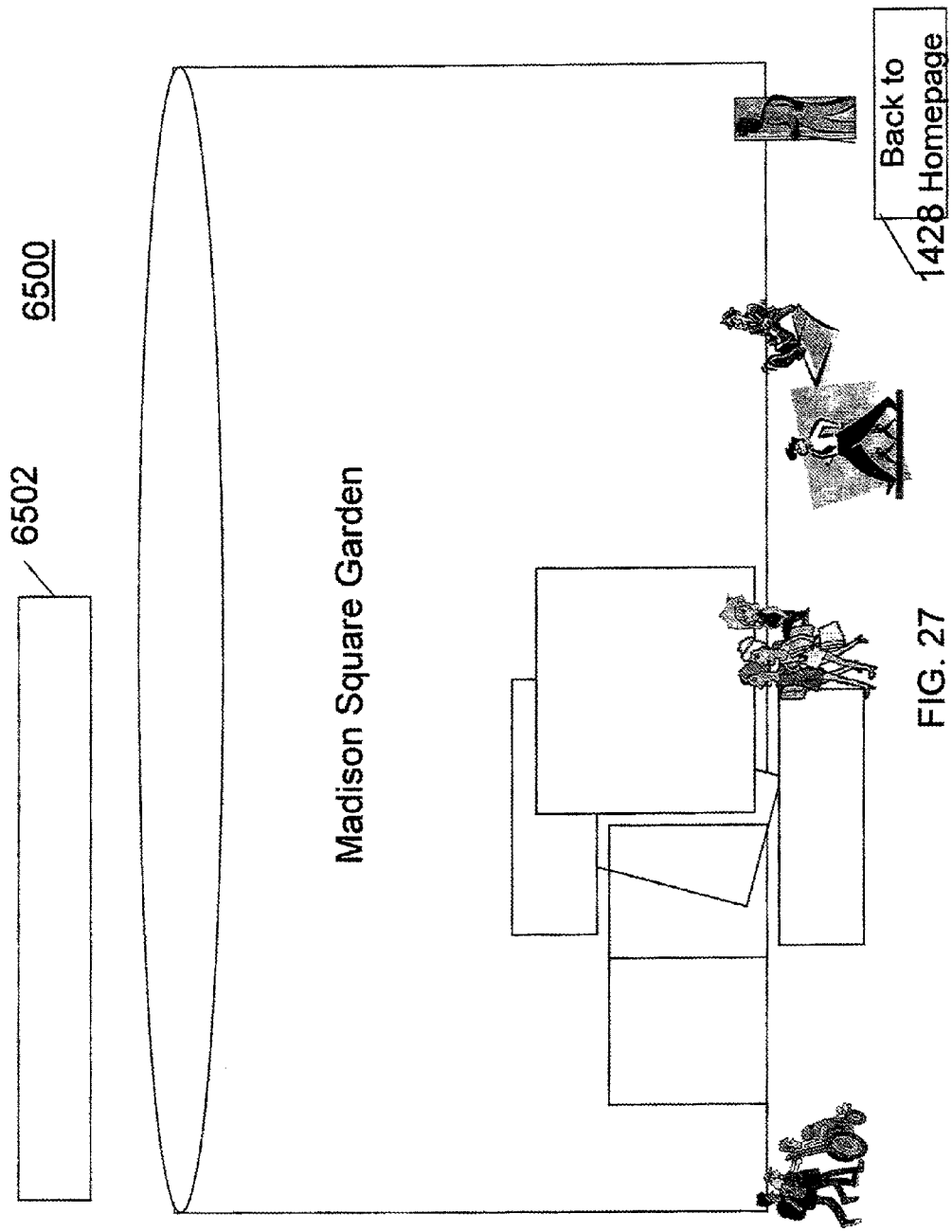
FIG. 27 is an exemplary GUI illustrating an exemplary venue for concerts and songs generated by the inventive system.

A concert may be a random collection of cover songs, a collection of cover songs from a specific genre such as, for example, 1960's British invasion, a collection of cover songs from a specific band such as, for example, U2, or other types of collections. User 120 can attend the concert by clicking on button 1208 on GUI 1200 in FIG. 6, which will generate an exemplary GUI 6500 shown in FIG. 27. In an exemplary embodiment, the virtual concert can be an approximate predetermined time such as, for example, about an hour. Alternatively, the concert can be a predetermined number of songs such as, for example, fifteen (15) songs. The concert can start by showing the exterior of a known concert venue, such as, for example, Madison Square Garden in New York, which is shown in FIG. 27. Computer-generated video of the concert venue can be shown in the background, along with the avatars of all members who are attending the concert, showing them walking toward the doors of the concert venue.

Figure 28:
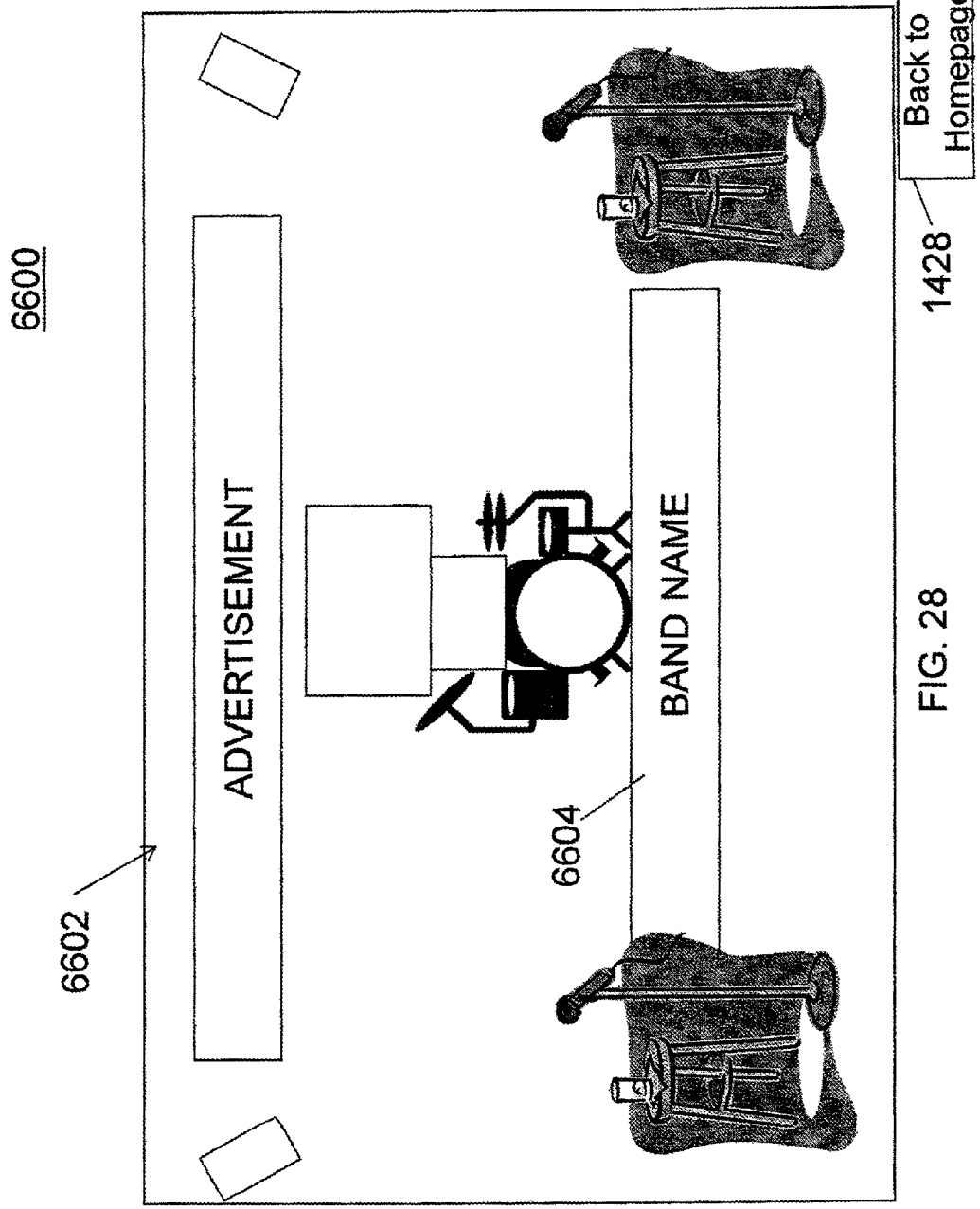
FIG. 28 is an exemplary GUI of a stage used perform the concert at the venue illustrated FIG. 27.

The computer-generated video can be provided from the point of view of a concert attendee as he/she approaches the venue. As the concert attendee gets nearer, the doors to the venue can open to allow the concert attendee to "enter" the venue. The computer-generated video can change to a front row seat at the concert, so that GUI presented to user 120 is that of a concert stage 6602, shown in exemplary GUI 6600 in FIG. 28. Stage 6602 can be empty of performers, with maybe a drum kit and some microphones set up on stage 6602. Original songs can be played by system 100 to entertain members until the start of the concert.

Each user 120 "attending" the concert can view the same video, regardless of when they click in to the concert. For example, a first user 120 who attends the concert two minutes before the start of the concert will be shown the same video as a second user 120' who attends the concert five minutes before the start of the concert. The separate videos will "synch up" when the different users are viewing the empty stage 6602.

Figure 29:
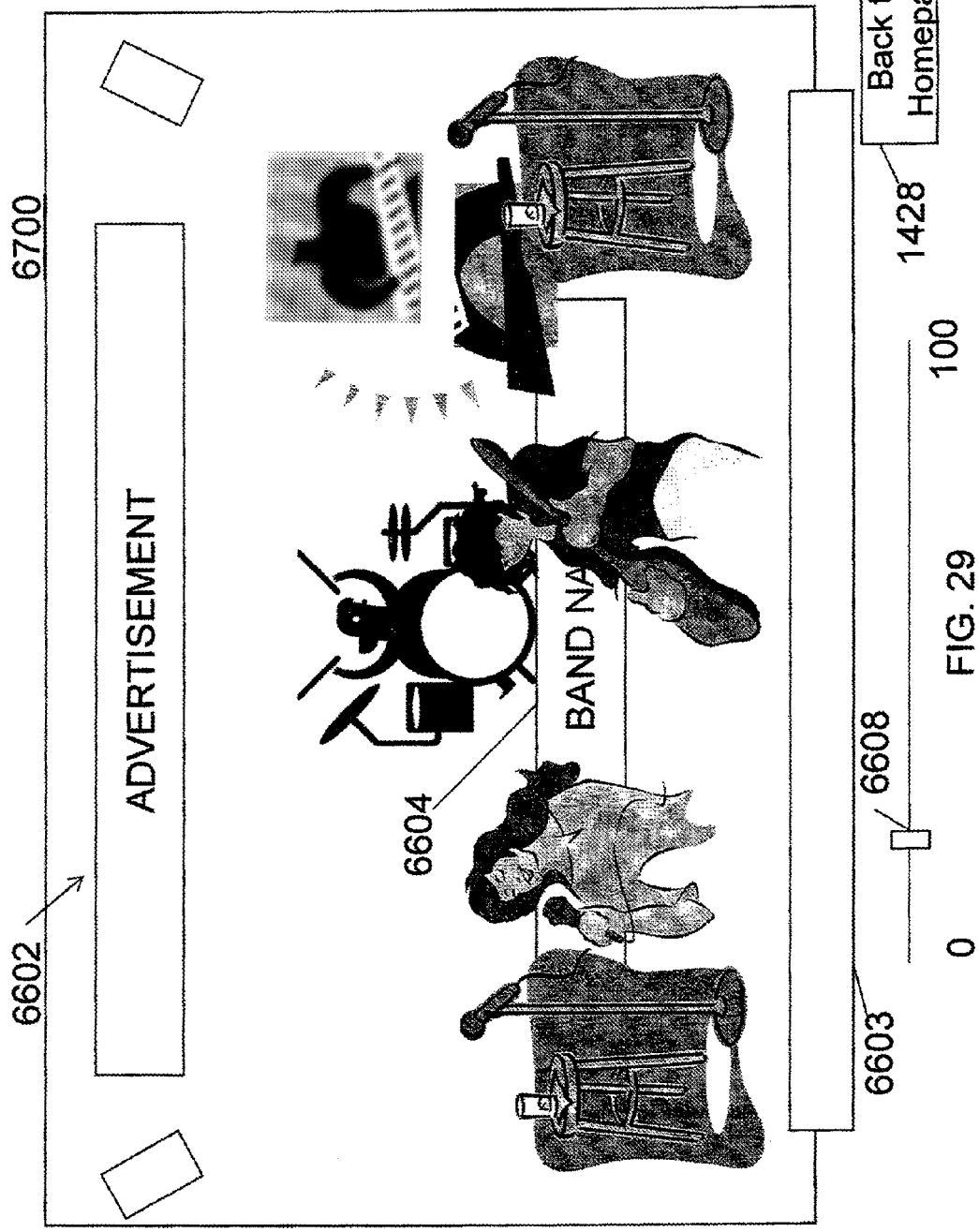
FIG. 29 is an exemplary GUI the stage of FIG. 28, with avatars of the users whose tracks are being played at the concert being displayed.

As the concert is about to begin, avatars represented by the members whose song will be played first enter the stage 6602, as shown in exemplary GUI 6700, shown in FIG. 29. Information about the members, such as, for example, their user name, location, age, favorite music, bands, etc. may be displayed, such as, for example, in a scrolling fashion in a text box 603 at the bottom of stage 6602. It is suggested however, that no identifying information about the members be displayed, so that members can remain anonymous to other members who are viewing system 100. The name of the band can be displayed on a banner 6604 located somewhere on stage 6602.

As each song is being played, the concert attendees have the option to rate the quality of the song, such as, for example, by sliding a slider bar 6608 that is displayed along the bottom of stage 6602. Slider bar 6608 can be scaled from 0 to 100, with "0" meaning that the concert attendee does not like the song, and "100" meaning that the concert attendee likes the song very much. At the end of the song, applause can be generated based on the average slider bar value generated by the concert attendees. A song with a low score generates only a few claps, while a song with a high score generates thunderous applause.

In order to discourage unwanted recording of the concert or songs being played at the concert, a periodic audible tone can be generated by system 100 during the play of each song. The tone is loud enough and long enough to discourage recording of the concert or the songs, but is sufficiently quiet enough and sure enough to allow listeners to listen to the concert without being overly distracted by the tone.

Alternatively, an announcer can make announcements over the beginning and or and of the song to discourage recording of the song. For example, the announcer can announce the title of an upcoming song, announce the name of the band and/or the username of the person who mixed the upcoming or previous cover song, advertise a future concert, or other types of announcements that may provide information to the concert attendees.

Still alternatively, a concert can be generated by a user 120. After user 120 has recorded a predetermined amount of cover songs, system 100 transmits an e-mail message to user 120 that notifies user 120 that user 120 is eligible to stage his/her own concert. If user 120 decides to stage a concert, user 120 selects a date and time on which the concert will be performed. Optionally, user 120 may be required to pay a fee in order to stage the concert. In order to encourage users to stage their own concerts, however, system 100 can reward user 120 by awarding user 120 with points that can be redeemed through system 100. For example, every one hundred concert attendees who listen to the concert may result in user 120 being awarded a single point, up to a maximum number of points.

Additionally or alternatively, as discussed above, concert attendees can rank the quality of songs throughout the concert. The amount of points awarded to user 120 may be determined by the ranking of each individual song and/or the cumulative ranking of the entire concert. Similar to the concert generated by system 100 above, a periodic audible tone can be generated during the user-generated concert.

Because the users of system 100 may be located in time zones all around the world, a user may be unable to "attend" a concert when it is first performed. A concert may therefore be played all people times over the course of a specific time period, such as a week, to enable users multiple opportunities to "attend" the concert. After this specific time period has passed, the concert can be archived for users to "attend" at a later date. For example, a user can click on button 6502 shown in exemplary GUI the 6500 in FIG. 27 and type in a keyword to bring up the concert. Because the concert has been archived, the user may be required to pay a fee to "attend" this archived concert.

A well-known artist can "sponsor" a concert by recording at least one track for a multiple of his/her songs and allowing other users to add remaining tracks which then can be mixed to form a cover versions of the artist's songs. For example, Elton John could provide vocal and keyboard tracks and allow users to provide other tracks such as, guitar, bass, and drums. The songs can be pieced together to form a concert.

In order to "attend" the concert, users may be required to pay a modest concert fee, a portion of which can be directed to a charitable organization sponsored by the well-known artist. As an incentive to review the concert, the artist may play a new original song, such as a song to be included on a yet to be released album, or some other original song by the artist that he/she has never recorded before. As part of the advertisement for the concert, users can be informed that the concert will include a "world premiere" song by the artist that can only be heard during the concert.

Figure 30:
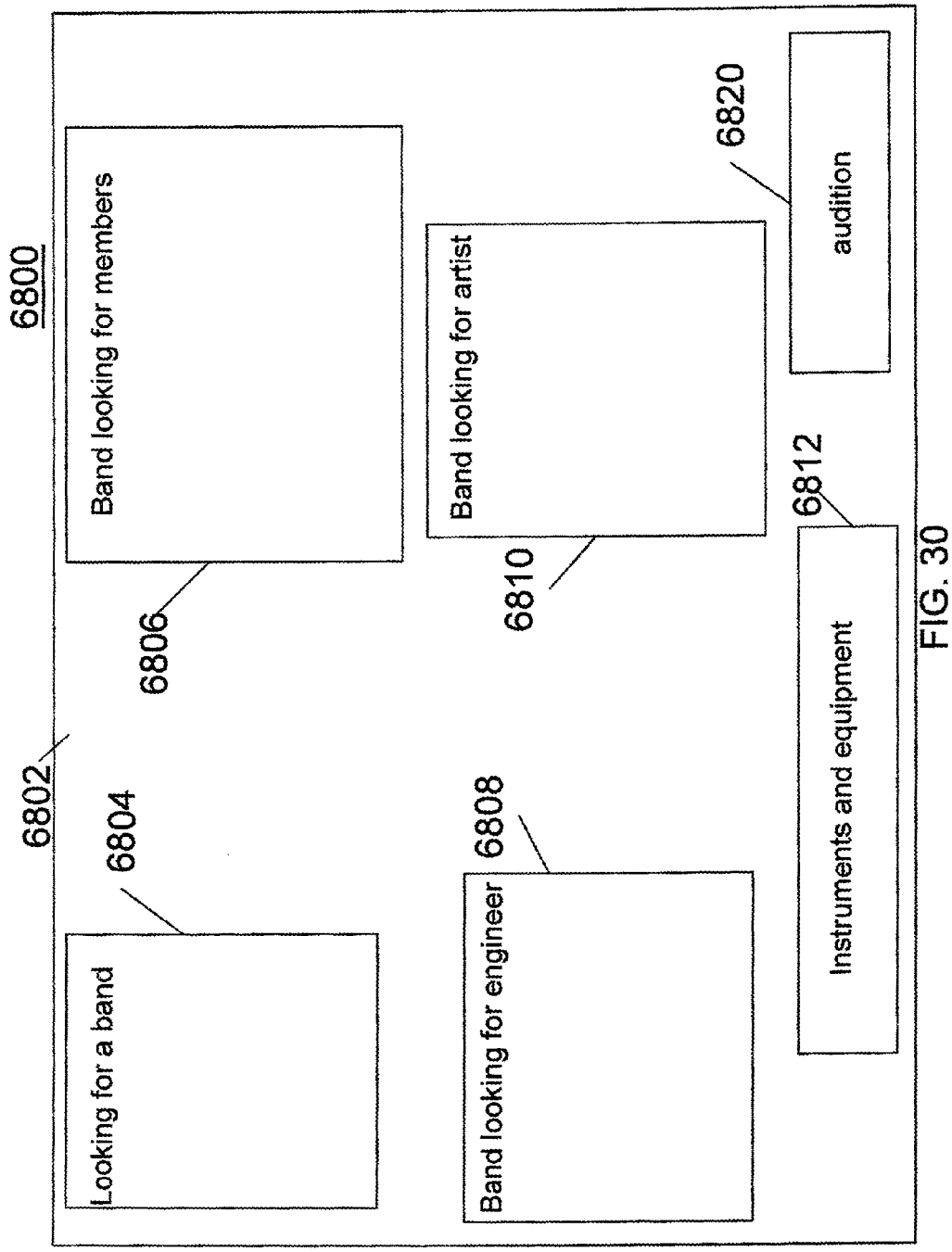
FIG. 30 is an exemplary GUI illustrating classified ads available through the inventive system.

After user 120 has registered with system, user's credentials, or resume, 121 are posted in a "Classified" section 6802 of system 100 in a category or categories of the user's choice. If desired, user 120 can advertise his/her services in the "Classified" section by clicking on button 1214 on GUI 1200 shown in FIG. 6. Clicking on button 1214 generates an exemplary GUI 6800, shown FIG. 30.

Categories 6804-6810 may be "looking for a band", "band looking for members", "band looking for engineer", or "band looking for artist". Information about user 120 or user 120's band may be posted under user 120's username. Such information may include the instrument that user 120 plays, the number of tracks that user 120 has recorded, the average rating for each of user 120's tracks, user 120's username, and any autobiographical information that user 120 desires to add to his profile.

Additionally, the classifieds may include an "instruments and equipment" section 6812 that allows users to advertise instruments or equipment that they are trying to sell and/or purchase.

If user 120 responds to a classified ad of a band looking for a band member by clicking on "looking for a band" button 6804, user 120 can submit samples of tracks 122 that he/she has already recorded or songs on which he provided a particular track. After clicking on the selected band in category 6806, user 120 clicks on an "audition" button 6820, which notifies the person who placed the classified ad that user 120 is auditioning for the advertised position. The advertiser is provided links to user 120's tracks and allows the advertiser to listen to the selected track 122 by itself, with the original song, or with a plurality of other user—generated tracks that the advertiser selects. For example, if the advertiser is advertising for a bass player, the advertiser can combine user 120's bass track along with other tracks generated by the advertisers other band members in order to determine how user 120's bass track fits with the advertiser's tracks.

Alternatively, instead of waiting for a bass player to find the band, the band can search out bass players and ask them to join the band. For example, a user can click on "band looking for members" category 6806 to search out bass tracks for a particular song and, if the advertiser likes a track from a particular bass player, advertiser can click on the bass player's screen name is displayed in category 6806 to find other tracks generated by that user. The band member looking for the bass player is directed to the bass player's home page (such as, for example exemplary GUI 1200 shown in FIG. 6). The advertiser can then click on any of those tracks and listen to the track to determine whether that particular bass player is a good fit for the band.

Still alternatively, the advertiser can provide a play list of songs that he has recorded and perform a search for bass players who have recorded tracks for those songs. The other users found in the search can be listed according to the frequency of a particular user playing the selected songs. For example, a user who has recorded tracks for more of the selected songs will be listed higher than a user who has recorded tracks for less of the selected songs. A user 120 who is a member of a band is not necessarily restricted to being a member of only that band. Any user can be a member of any number of bands throughout system 100.

While it is possible for a musician to select tracks generated by other users in combination with tracks that the musician has recorded in order to form cover songs, a user of system 100 may not necessarily have recorded a track or even be a musician in order to form his/her own cover songs. This person may be merely a "spectator" who combines tracks generated by others as he/she sees fit in order to form his/her own cover songs.

As illustrated throughout the figures, such as, for example, in FIGS. 3-16, 24, 26, advertisements, such as banner advertisements 1010 and side advertisements 1450, can be shown along the top or sides of any GUI. Advertisements 1010, 1450 can be targeted to specific users based on their physical location, as determined by their Internet Protocol (IP) address, cell phone area code, or address information previously inputted into system 100 by user 120. Alternatively, advertisements 1010, 1450 can be targeted based on the type of musical instrument(s) that user 120 uses to upload his music onto system 100. For example, if user 120 uploads a drum track, then advertisement 1010, 1450 may be directed to drum stores and/or drum accessories. As is well-known in the art, each time that user 120 clicks on advertisement 1010, 1450, the advertiser pays the operator of system 100 a predetermined fee.

As user 120 uses various aspects of system 100, user 120 has the opportunity to accumulate stars that can be redeemed through system 100. For example, if user 120 rates another user's track or cover song, user 120 may be awarded one star. Further, if user's 120 track or cover song is rated by other users, such as in step 1914 or step 1916, as shown in FIG. 8A, user 120 may be awarded stars, such as, for example, one point for a review of a track, two stars for an excellent review of the track, three stars for a review of a cover song, and five stars for an excellent review of a cover song. Further, if the user's cover song is selected to be played in the virtual concert, user 120 may be awarded ten stars. While exemplary values of star point awards are provided above, those skilled in the art will recognize that other star point values may be awarded.

The amount of stars that user 120 has earned may be shown in button 1210 on GUI 1200, shown in FIG. 6. In order to redeem the stars, all payment options for purchases throughout system 100 provide user 120 the opportunity to pay through their preloaded account or by redeeming stars. User 120 may use stars throughout system 100 such as, for example, to purchase an original song to download, to purchase a cover song, to purchase hardware such as, for example, guitar strings or drum sticks, or to purchase other items that may be available for sale throughout system 100.

Additionally, stars may be "traded" for services. For example, a user 120 who has accumulated, but not redeemed, his stars can contact an artist through category 6810 in GUI 6800 to generate an album or CD cover in exchange for stars. Alternatively, user 120 can contact a sound engineer through category 6808 in GUI 6800 to help mix tracks to form a cover song, and award the engineer for his/her work with some of the user's stars. The artist and the engineer can then redeem stars for other goods/services throughout system 100.

Figure 31:
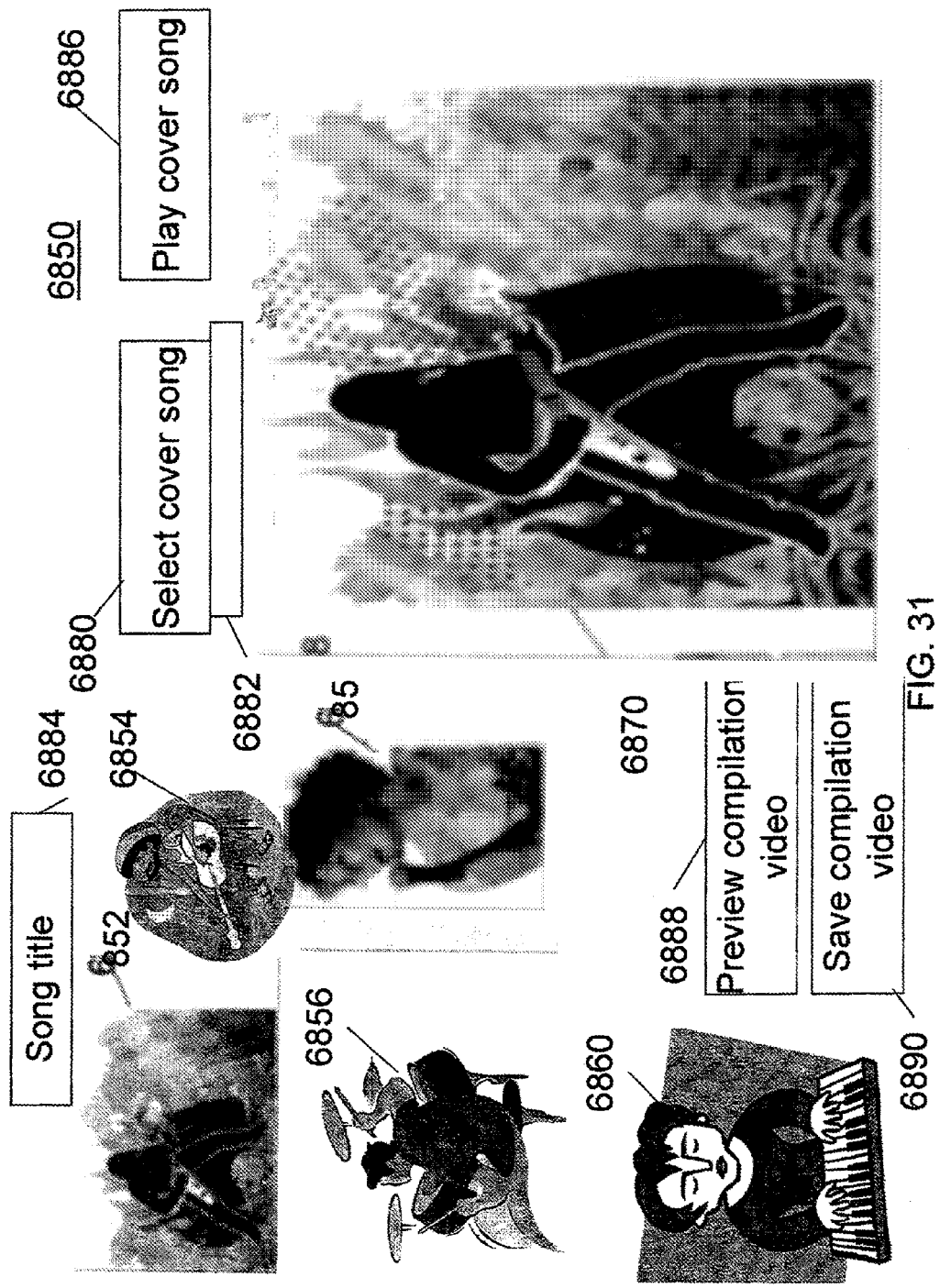
FIG. 31 is an exemplary GUI illustrating videos that can be generated by using the inventive system.

Additionally, a user 120 can compile his/her own cover song or use a cover song created by another user and add video to that cover song to generate a music video to the cover song. The user 120 can save the video in the same manner that a cover is saved as described above. From GUI 1700 (illustrated in FIG. 7), user 120 can select "add video" button 1206c, which generates GUI 6850, shown in FIG. 31.

As user 120 plays a cover song that he/she has generated, videos 6852-6860 associated with each individual track that were recorded and saved to system 100 by the originator of each individual track are played in conjunction with the cover song. As user 120 clicks on a particular video, that video is shown in a master video screen 6870, to allow user 122 "mix" different videos into a single compilation. User 120 selects the cover song for which he/she would like to generate the video by clicking on button 6880, which generates a drop-down menu 6882 of cover songs that user 120 has generated through system 100. User 120 selects a desired cover song, whose title displayed in block 6884. All of the videos 6852-6860 that have been generated with tracks corresponding to the tracks that comprise the selected cover song are displayed in GUI 6850. When user 120 is ready to generate his/her own compilation video, user 120 clicks on button 6886. The cover song begins to play and user 120 clicks on each of the individual videos 6852-6860 as desired to form different scenes of the compilation video. After the cover song has played, user 120 can preview the compilation video on master video screen 6870 by clicking on button 6888. If user 120 is satisfied with the compilation video, user 120 can click on button 689 to save the video to user's folder. If, however, user 120 is not satisfied with the video, as user 120 previews the compilation video, user 120 can edit the compilation video by clicking on any of videos 6852-6860, as the compilation video is being played, which will overlay and replace the clicked on video 6852-6860 over the previously compiled video.

Figure 32:
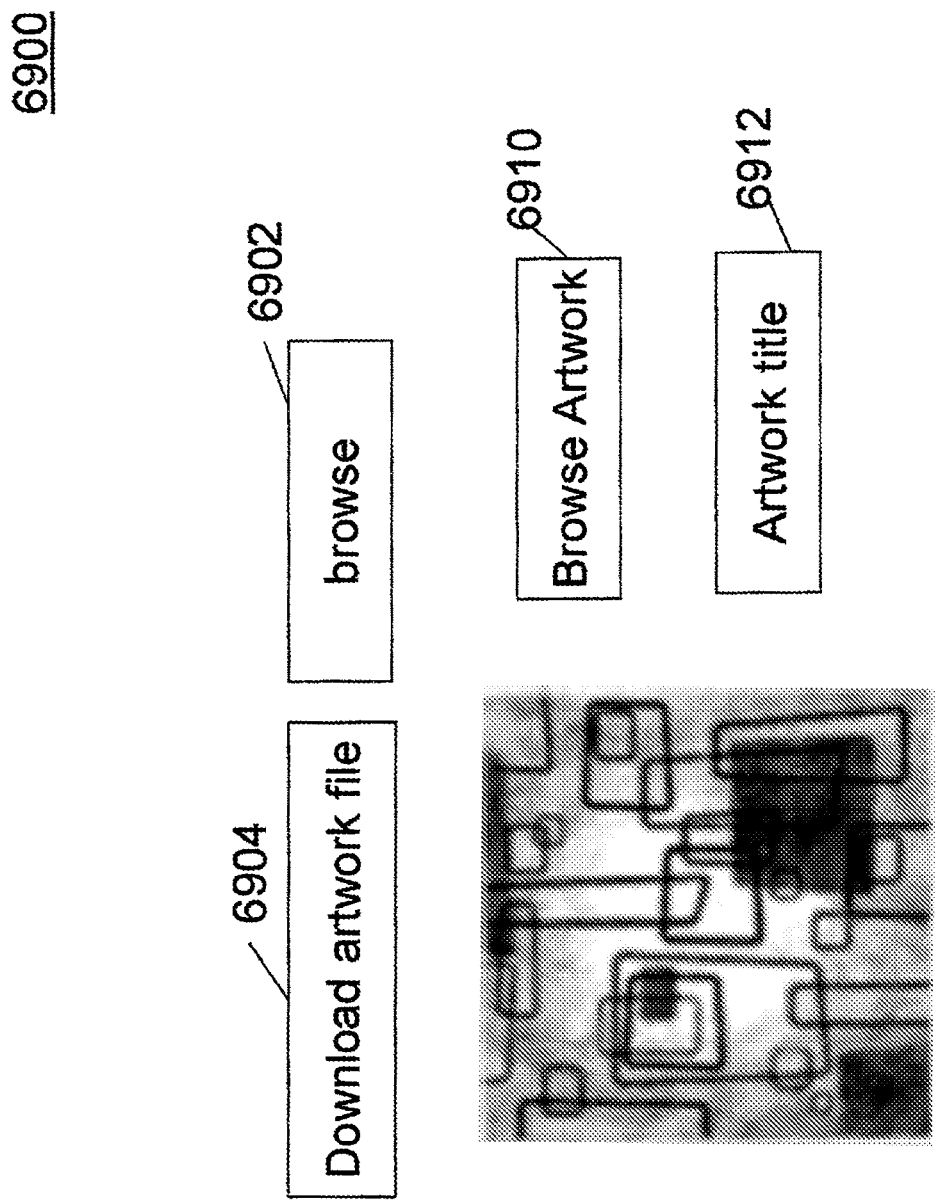
FIG. 32 is an exemplary GUI illustrating artwork that can be saved to and downloaded from the inventive system

In addition to music, system 100 allows artists an opportunity to showcase their artistic talents. After logging in to system 100 as described above, an artist may select button 1206d from GUI 1700, which generates GUI 6900 shown in FIG. 32. The artist may download a previously produced piece of artwork, which is stored in a folder 710 titled "Artwork," that is shown schematically in FIG. 1. As is well known in the art, in order to download the artwork file, the artist clicks on a "browse" button 6902, which allows the artist to scroll through a "download artwork file" menu 6904. When the artist sees the title of the file that he/she would like to download, the artist clicks on the file title, which saves the artwork file in folder 710 under the artist's username and the file title.

In order to access an artwork file saved in folder 710, a user 120 may click on a "Browse Artwork" icon 6910 in exemplary GUI 6900 to access the artwork in folder 710 and view available artwork. Repeatedly clicking on icon 6910 scrolls through the artwork that is saved in folder 710. When user's 120 finds a piece of art that he/she would like to use, user 120 clicks on the title of the art that is shown in button 6912 and is given the option to save the artwork to his/her computer. When the artist's artwork is saved by another user 120, the artist is awarded stars that can be deemed throughout system 100 as described above.

In an exemplary embodiment of the invention, a famous musical artist (or group) may be engaged to promote one or more of their songs within system 100. System 100 can include an advertisement that the artist has laid down a lead vocal track 110a for a particular song. User 120 can then lay down his/her own tracks in any track categories 110b-n and select desired tracks 122a-n with lead vocal track 110a provided by the artist or just select desired tracks 122a-n with lead vocal track 110a provided by the artist for forming their own cover song in a manner similar to the method described above. User 120 can then download a cover song with the artist singing lead vocal. Alternatively, if the artist is more widely knows for his/her instrumental ability rather than his/her vocal ability, the artist can lay down a musical track and let user 120 lay down lead vocal track 110*a* instead. A premium fee can be charged for user 120 to download this song, with at least part of the premium fee going to the artist for his/her participation in system 100 or, alternatively, at least part of the premium fee can be directed to a charity selected by the artist.

Still alternatively, the artist can select tracks 110*b-n* that he/she would like to combine with his/her vocal track 110*a* to form a cover song with his/her own "band." The users who generated selected tracks 110*b-n* can be informed that their track 110*b-n* was selected via system messaging system 1230 (see FIG. 5) and that the song that was formed from those tracks will be featured "on stage" on a particular date and time. The user's avatar will appear on stage with the avatar of the artist so that each selected user 120 can see his/her avatar "playing" with the artist. The users whose tracks 110*b-n* have been selected can also be rewarded with stars.

System 100 may be subsidized by advertisements displayed throughout the various GUI, as well as through the purchase of original songs as well as cover songs by members of system 100. Further, system 100 may generate revenue by charging user 120 a fee to host his/her own concert, with the reward to user 120 being the awarding of dollars that can be used to purchase items through system 100 based on the number of people who attends the concert. Further, system 100 can charge a nominal fee to users to advertise in the classified section of system 100.

Examples of the operation of system 100 are discussed in detail below and with respect to flowcharts 7000-7400 in FIGS. 33-37.

Figure 33:
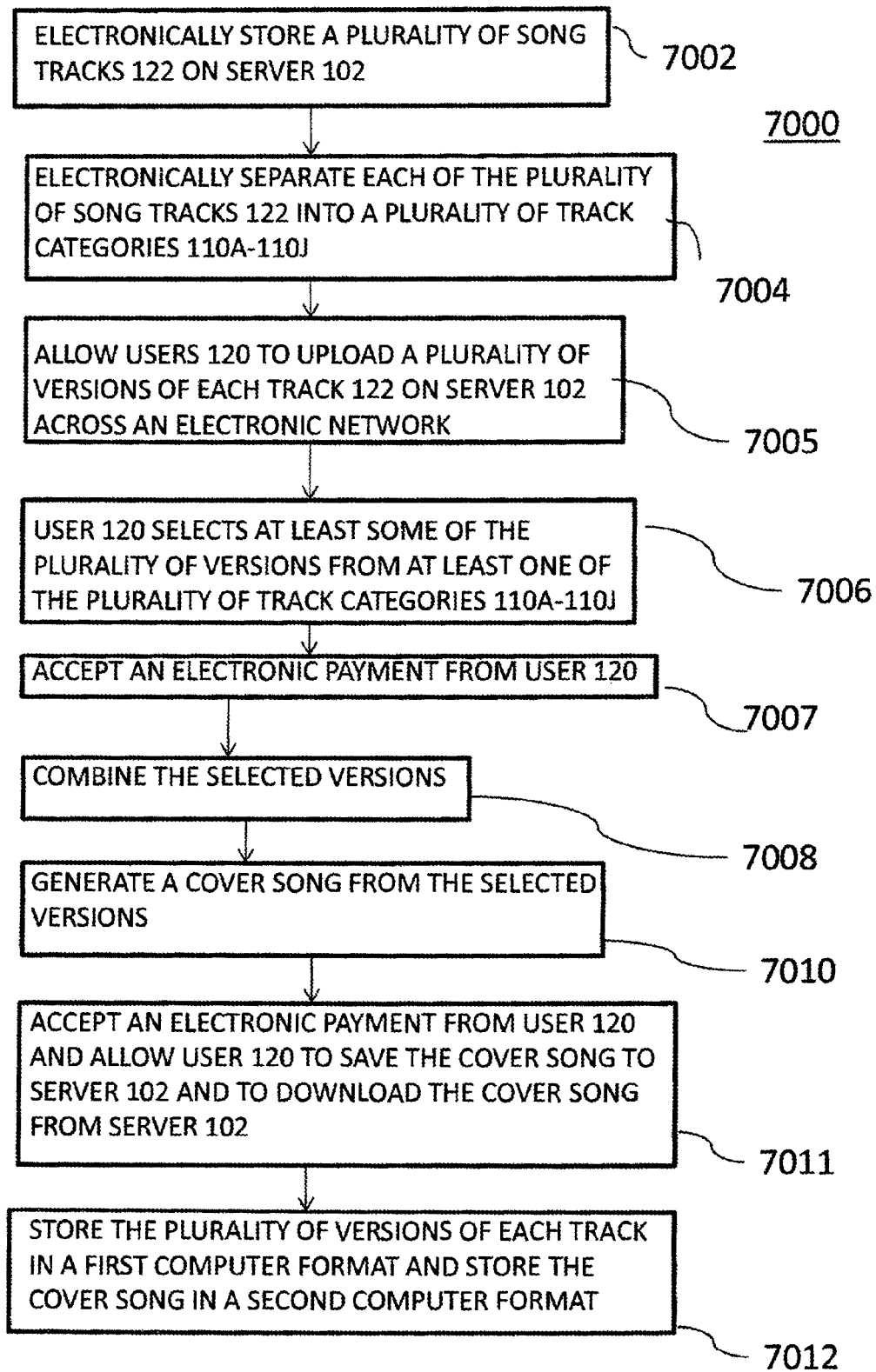
FIG. 33 is a flowchart illustrating an exemplary operation of the inventive system.

As shown in flowchart 7000 in FIG. 33, in step 7002, system 100 electronically stores a plurality of song tracks 122 on server 102. In step 7003, system 100 electronically separates each of the plurality of song tracks 122 into a plurality of track categories 110*a*-110*j*. In step 7004, system 100 allows users 120 to upload a plurality of versions of each track 122 on server 102 across an electronic network. In step 7006, system 100 allows user 120 to select at least some of the plurality of versions from at least one of the plurality of track categories 110*a*-110*j*. In step 7008, system 100 combines the selected versions. In step 7010, system 100 generates a cover song from the selected versions. In step 7005, before allowing user 120 to select at least some of the plurality of versions, system 100 accepts an electronic payment from user 120. In step 7012, system 100 stores the plurality of versions of each track in a first computer format and stores the cover song in a second computer format. In step 7011, system 100 accepts an electronic payment from user 120 and allows user 120 to save the cover song to server 102 and to download the cover song from server 102.

Figure 34:
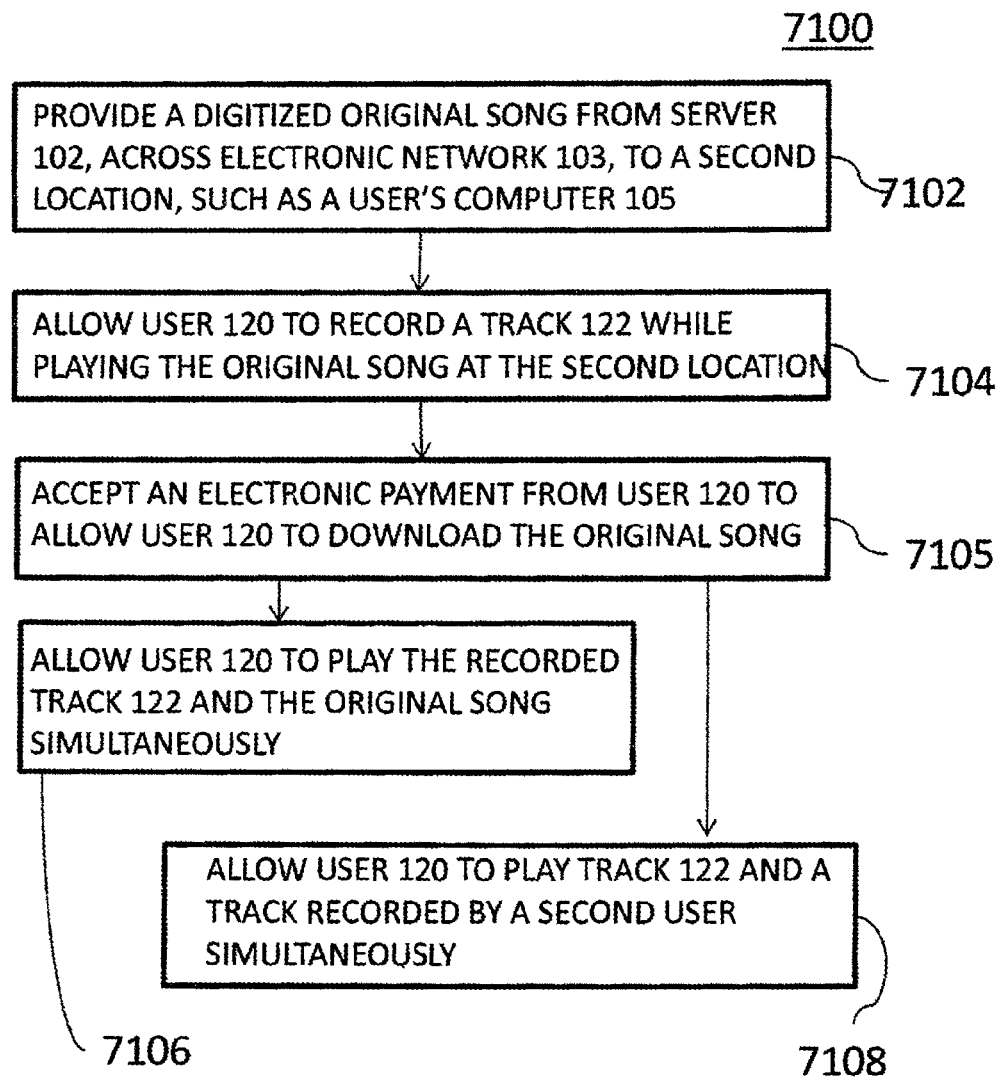
FIG. 34 is a flowchart illustrating an exemplary operation of the inventive system.

As shown in flowchart 7100 in FIG. 34, in step 7102, system 100 provides a digitized original song from server 102, across electronic network 103, to a second location, such as a user's computer 105. In step 7104, system 100 allows user 120 to record a track 122 while playing the original song at the second location. In step 7106, system 100 allows user 120 to play the recorded track 122 and the original song simultaneously. In step 7105, system provides, between steps 7104 and 7106, after providing the digitized original song and before allowing 120 to record the track 122, the step of accepting an electronic payment from user 120 to allow user 120 to download the original song. In step 7108, system 100 allows user 120 to play track 122 and a track that was recorded by a second user simultaneously.

Figure 35:
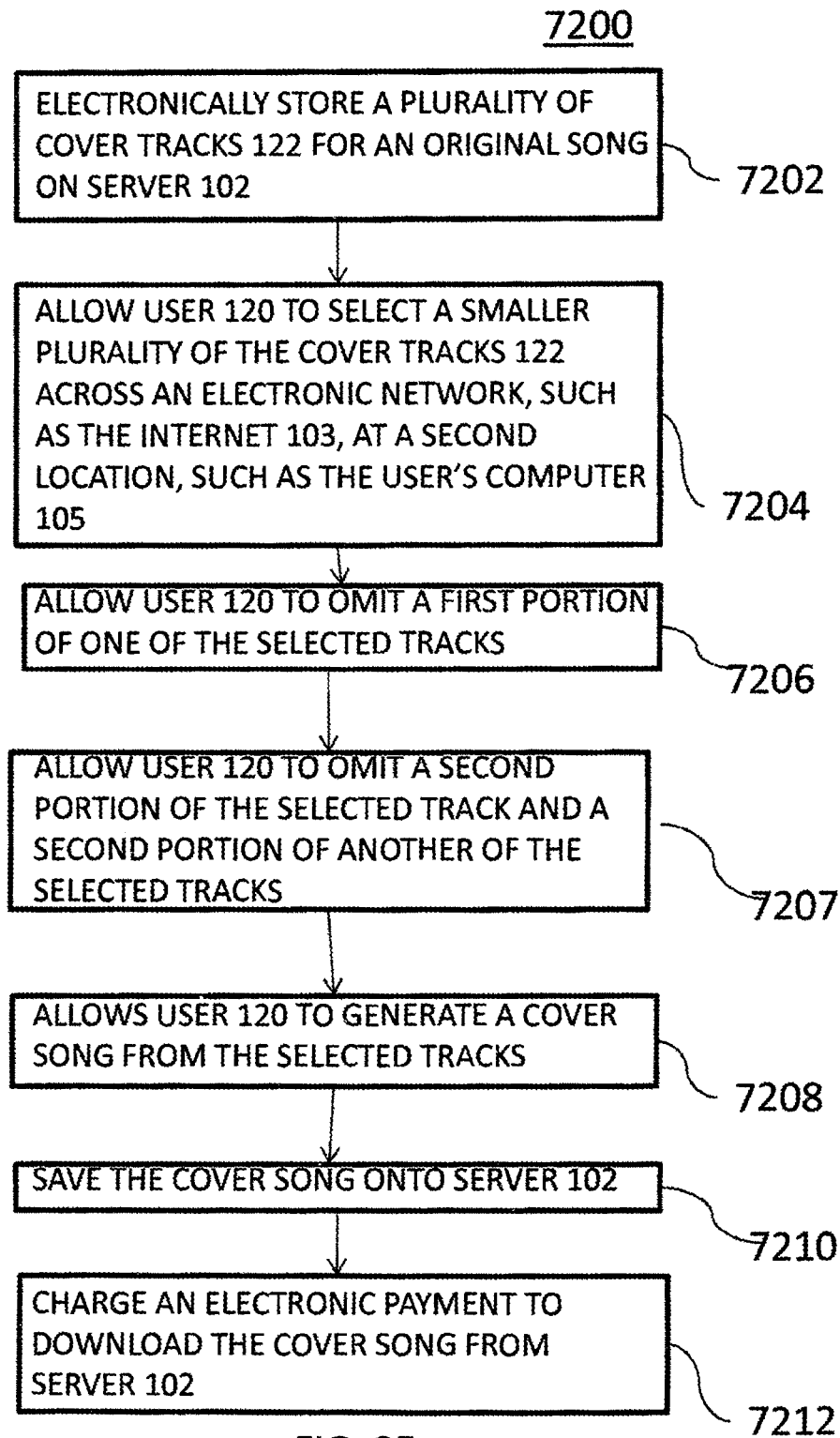
FIG. 35 is a flowchart illustrating an exemplary operation of the inventive system.

As shown in flowchart 7200 in FIG. 35, in step 7202, system 100 electronically stores a plurality of cover tracks 122 for an original song on server 102. In step 7204, system 100 allows user 120 to select a smaller plurality of the cover tracks 122 across an electronic network, such as the Internet 103, at a second location, such as the user's computer 105. In step 7206, system 100 allows user 120 to omit a first portion of one of the selected tracks. In step 7208, system 100 allows user 120 to generate a cover song from the selected tracks. In step 7207, after step 7206 and before step 7208, system 100 allows user 120 to omit a second portion of the selected track and a second portion of another of the selected tracks. In step 7210, system 100 saves the cover song onto server 102. In step 7212, system 100 charges an electronic payment to download the cover song from server 102.

Figure 36:
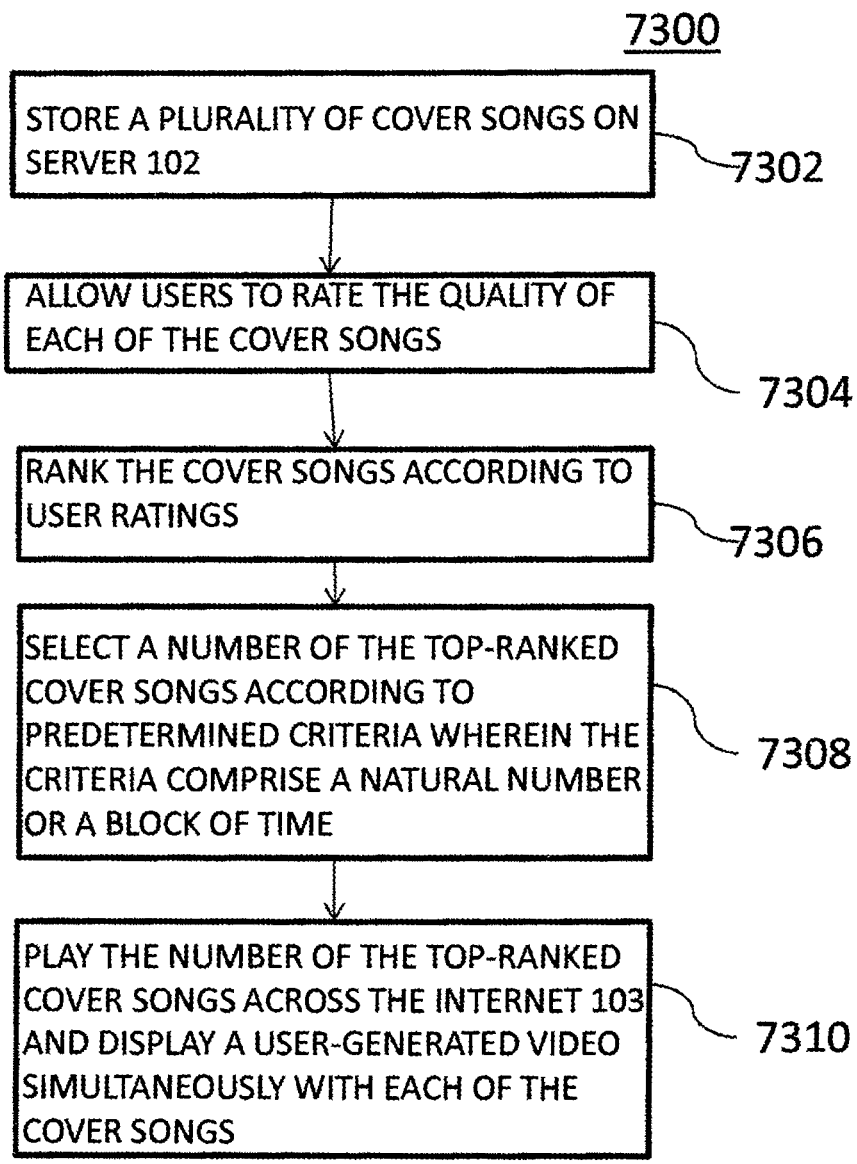
FIG. 36 is a flowchart illustrating an exemplary operation of the inventive system.

As shown in flowchart 7300 in FIG. 36, in step 7302, system 100 stores a plurality of cover songs on server 102. In step 7304, system 100 allows users to rate the quality of each of the cover songs. In step 7306, system 100 ranks the cover songs according to user ratings. In step 738, system 100 selects a number of the top-ranked cover songs according to predetermined criteria wherein the criteria comprise a natural number or a block of time. In step 7310, system 100 plays the number of the top-ranked cover songs across the Internet 103 and displays a user-generated video simultaneously with each of the cover songs.

Figure 37:
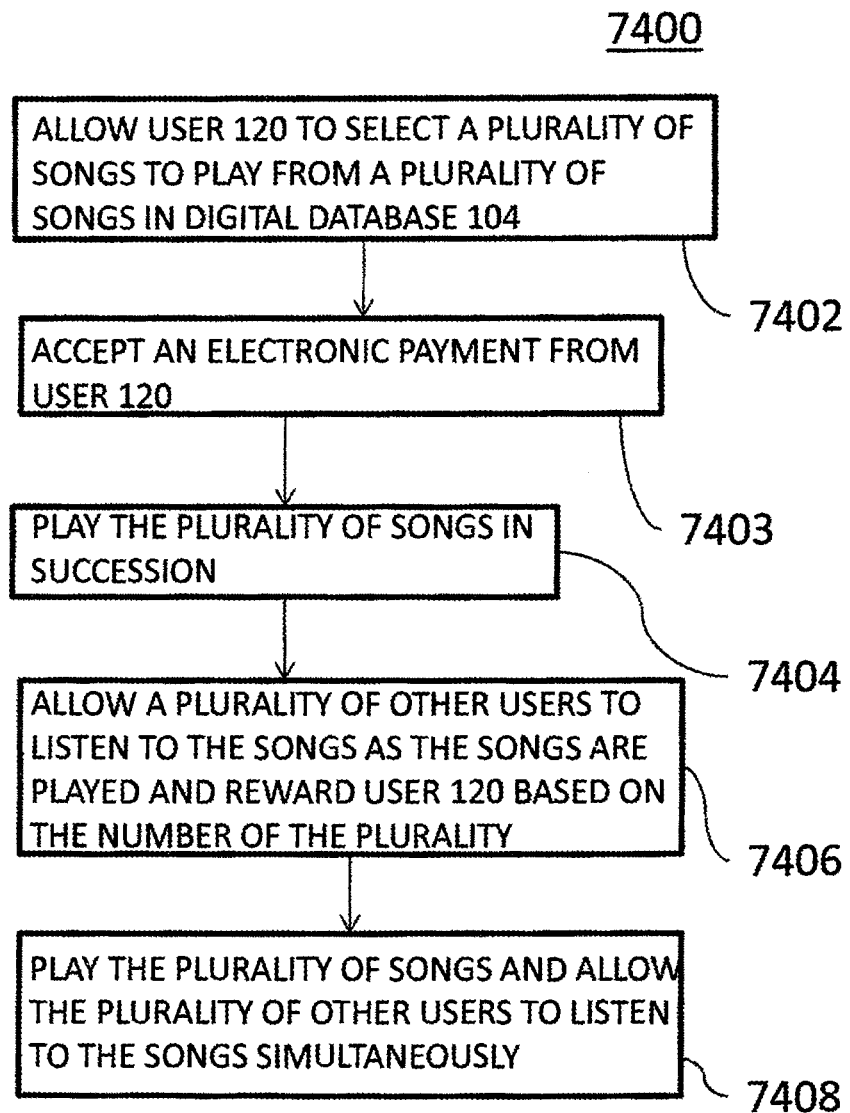
FIG. 37 is a flowchart illustrating an exemplary operation of the inventive system.

As shown in flowchart 7400 and FIG. 37, in step 7402, system 100 allows user 120 to select a plurality of songs to play from a plurality of songs in digital database 104. In step 7404, system 100 plays the plurality of songs in succession. In step 7406, system 100 allows a plurality of other users to listen to the songs as the songs are played and rewards user 120 based on the number of the plurality. In step 7408, system 100 plays the plurality of songs and allowing the plurality of other users to listen to the songs simultaneously. In step 7403, prior to playing the plurality of songs, system 100 accepts an electronic payment from user 120.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method of recording music, the method comprising the steps of:
    a) electronically storing a plurality of original songs on a server at a first location;
    b) allowing a first user to select one of the plurality of original songs from a second location across an electronic network;
    c) allowing the first user to play the one of the plurality of original songs at the second location and to record a user-generated track at the first location while the one of the plurality of original songs is playing; and
    d) saving only the user-generated track on the server at the first location separate from the one of the plurality of original songs.

2. The method according to claim 1, further comprising storing the user-generated track in one of a plurality of predefined instrument categories.

3. The method according to claim 2, further comprising allowing a plurality of additional user-generated tracks to be recorded and categorized in the plurality of predefined instrument categories.

4. The method according to claim 3, further comprising allowing a second user to select at least one of the plurality of additional user-generated tracks to be combined by the second user to form a cover song.

5. The method according to claim 1, wherein the one of the plurality of original songs has a start time and wherein the user-generated track has the same start time.

6. The method according to claim 1, wherein the one of the plurality of original songs has a time duration and wherein the user-generated track has the same time duration.

7. The method according to claim 1, further comprising, after step d), allowing the first user to combine the user-generated track with at least one other user-generated track to form a cover song.

8. A recording system comprising a server located at a first location, the server containing a plurality of original songs in a first database, the server being electronically connected across an electronic network to a recording site, wherein the server is adapted to simultaneously transmit one of the plurality of original songs across the network to the recording site and to record a track being played at the recording site to a second database in the server, wherein the one of the original songs has a start time and wherein the track has the same start time.

9. The recording system according to claim 8, wherein the second database comprises a plurality of tracks stored in predefined musical instrument categories.

10. The recording system according to claim 8, wherein the one of the original songs has a time duration and wherein the track has the same time duration.

11. The recording system according claim 8, wherein the track is combinable with at least one other track at a mixing site electronically connected to the second database across an electronic network to form a cover song.

12. The recording system according to claim 11, further comprising a payment acceptance module electronically connected to the second database and adapted to accept a payment from the mixing site.

13. A non-transitory machine-readable storage medium, having encoded thereon program code, wherein, when the program code is executed by a machine, the machine implements a method for recording music, comprising the steps of:
   a) electronically storing a plurality of original songs on a server at a first location;
   b) allowing a first user to select one of the plurality of original songs from a second location across an electronic network;
   c) allowing the first user to play the one of the plurality of original songs at the second location and to record a user-generated track at the first location while the one of the plurality of original songs is playing; and
   d) saving only the user-generated track on the server at the first location separate from the one of the plurality of original songs.

14. The non-transitory machine-readable storage medium according to claim 13, wherein the method further comprises storing the user-generated track in one of a plurality of predefined instrument categories.

15. The non-transitory machine-readable storage medium according to claim 14, wherein the method further comprises allowing a plurality of additional user-generated tracks to be recorded and categorized in the plurality of predefined instrument categories.

16. The non-transitory machine-readable storage medium according to claim 15, wherein the method further comprises allowing a second user to select at least one of the plurality of additional user-generated tracks to be combined by the second user to form a song.

17. The non-transitory machine-readable storage medium according to claim 16, wherein the method further comprises accepting an electronic payment across the electronic network from the second user.

18. The non-transitory machine-readable storage medium according to claim 13, wherein the method further comprises, before step b), accepting an electronic payment across the electronic network from the first user.

19. The non-transitory machine-readable storage medium according to claim 13, wherein the method further comprises, after step d), allowing the first user to combine the user-generated track with at least one other user-generated track to form a cover song.

* * * * *